United States Patent [19]
von Brandt

[11] Patent Number: 4,924,310
[45] Date of Patent: May 8, 1990

[54] METHOD FOR THE DETERMINATION OF MOTION VECTOR FIELDS FROM DIGITAL IMAGE SEQUENCES

[75] Inventor: Achim von Brandt, Munich, Fed. Rep. of Germany

[73] Assignee: Siemens Aktiengesellschaft, Berlin and Munich, Fed. Rep. of Germany

[21] Appl. No.: 397,049

[22] Filed: Aug. 22, 1989

Related U.S. Application Data

[63] Continuation-in-part of Ser. No. 202,150, Jun. 2, 1988, abandoned.

[30] Foreign Application Priority Data

Jun. 2, 1987 [DE] Fed. Rep. of Germany ....... 3718491

[51] Int. Cl.⁵ .............................................. H04N 7/13
[52] U.S. Cl. ................................. 358/136; 358/105; 358/133; 375/122
[58] Field of Search ............... 358/133, 135, 136, 105; 375/27, 122

[56] References Cited

U.S. PATENT DOCUMENTS

| | | | |
|---|---|---|---|
| 4,619,230 | 9/1987 | Kaneko | 358/105 |
| 4,691,329 | 9/1987 | Juri | 375/122 |
| 4,695,882 | 9/1987 | Wada | 358/136 |
| 4,704,627 | 11/1987 | Yuyama | 358/136 |
| 4,805,017 | 2/1989 | Kaneko | 358/105 |

FOREIGN PATENT DOCUMENTS 2172171 9/1986 United Kingdom .

OTHER PUBLICATIONS

B. K. P. Horn, B. G. Schunck, "Determining Optical Flow", Artificial Intelligence 17, pp. 185-203, 1981.
H. G. Musmann, P. Prisch, H.-J. Grallert, "Advances in Picture Coding", Proc. III 73 (1985), pp. 523-548; C. M. Lin.
S. C. Kwatra: "Motion Compensated Interfram Color Image Coding", Proc. Int Conf. on Communications, 1985, vol. 1, pp. 516-520.
U. H. Brusewitz, P. Weiss, "A Video–Conference System at 384 Kbit/s", Picture Coding Symposium, Tokyo, Abstracts p. 212.
1986; G. Kummerfeldt, F. May, W. Wolff, "Coding Television Signals at 320 and 64 kbit/s", Image Coding, M. Kunt, T. S. Huang (Herausgeber), Proc. SPIE 594, pp. 119-128.
1985; P. Robert C. Cafforia, F. Rocca, "Time/Space Recursions for Differential Motion Estimation", Image (List continued on next page.)

*Primary Examiner*—Howard W. Britton
*Attorney, Agent, or Firm*—Hill, Van Santen, Steadman & Simpson

[57] ABSTRACT

A method for the determination of motion vector fields from digital image sequences derives a motion vector field from two successive image frames, with the motion vector field relating a picture element of the other image frame to every picture element of the one image frame, whereby the relation is defined by a motion vector which reproduces the displacement of the picture elements relative to one another and whereby respectively all picture elements in a square or rectangular block of picture elements receive the same motion vector. The determination of the motion vectors is carried out by minimization of a composite objective function which, first, takes into consideration the difference in the luminance values of the mutually allocated picture elements of the two established frames, and, then evaluates or weights the differences between adjacent or neighboring motion vectors, evaluating or weighting these with the assistance of a smoothing measure. The minimization of this objective function is carried out in such fashion that, first, the motion vectors minimizing the objective function are determined, given the restriction that the motion vectors in blocks larger than the blocks ultimately desired are constant, and that, subsequently, each of these blocks (16×6) is subdivided into smaller, preferably equal-sized blocks until the desired block size (4×4) is achieved.

15 Claims, 5 Drawing Sheets

OTHER PUBLICATIONS

Coding, M. Kunt, T. S. Huang (Herausgeber), Proc. SPIE 594, pp. 175-185, 1986.

R. Lenz, "Estimation of 2-D General Motion Parameters in TV Scenes", Proc. 7th Int. Conf. Pattern Rec. Montreal, Canada, Jul. 30–Aug. 2, 1984, vol. 1, pp. 546–548 u.

C. J. Radford: "Optical Flow Fields in Hough Transform Space", Pattern Recognition Letters 4, pp. 293-303, 1986.

H.-H. Nagel, W. Enkelmann, "An Investigation of Smoothness Constraints for the Estimation of Displacement Vector Fields from Image Sequences", IEEE Trans. PAMI-8/5, pp. 565-593, Sep. 1986.

Investigations of Multigrid Algorithms for the Estimation of Optical Flow Fields in Image Sequences, Wilfried Enkelmann, IEEE 1986, pp. 81-87.

BLOCK SUBDIVISION

MOTION VECTOR X16(m,n)
WITH FOUR NEIGHBORING VECTORS

METHOD FOR THE DETERMINATION OF MOTION VECTOR FIELDS FROM DIGITAL IMAGE SEQUENCES

This is a continuation-in-part, of application Ser. No. 202,150, filed 6/2/88 now abandoned.

BACKGROUND OF THE INVENTION

The present invention is directed to a method for the determination of motion vector fields from digital image sequences, in which a motion vector field is calculated from two successive images, said motion vector field relating every picture element of an image to a picture element of the other image, whereby the relation is respectively defined by a motion vector that reproduces the relative shift of the picture elements relative to one another, and whereby all picture elements in a square or rectangular block of picture elements receive the same motion vector.

It is necessary for various applications, for example, image data compression or machine vision (e.g. robots and automated scene analysis), to automatically acquire the shifts of the image contents from image frame to image frame in a digital image sequence that result from object movements or from camera movements. These shifts of the local image contents can be represented by motion vector fields that indicate, for example, for every picture element of an image, by how much the image content has shifted at this location in comparison to the preceding image frame.

In, for example, image data compression for the purpose of transmitting digital images with low data rates, the motion vector fields can be used to predict the next image frame that has not yet been transmitted from image frames that have already been transmitted. The data rate that is required for the transmission of the new image frame is all the lower the better this prediction can be made.

A further application of the motion vector fields is the reconstruction of missing image frames from an image sequence that was temporally subsampled for the purpose of data compression. For example, this means that only every third image frame of the sequence is available and the two missing image frames of the sequence are to be interpolated as optimally "correct in motion" as possible between two respectively existing images frames (the "point of reference images"), so that the motion of subjects in the reconstructed scene are executed as uniformly as in the original. Motion vector fields are required for this purpose, these indicating which picture elements are to be used in the two appertaining reference images for the reconstruction of every picture element of an image frame to be interpolated.

In every instance, a motion vector that describes the local motion with two components, namely, the horizontal and the vertical motion commponent, is allocated in the motion vector fields, for every picture element of an image frame or to a respective group of neighboring picture elements.

One problem in the determination of such motion vector fields results because the movements present in an image frame sequence are usually dependent on the location of the picture elements, so that a plurality of different motion vectors can occur in a small picture detail, particularly at the edges of moving subjects. For determining a motion vector for a specific picture element, only this picture element itself should actually be considered. On the other hand, a motion vector cannot be determined from a single picture element for the reason that the motion vector contains two components and every individual picture element defines only one equation for these two unknowns, cf., for example, B. K. P. Horn, B. G. Schunck, "Determining Optical Flow", Artificial Intelligence 17, Pages 185–203, 1981. Even in a small environment or surround around the picture element, however, the image content is often structured to such a slight degree that the motion at the location of the appertaining picture element cannot be unambiguously identified. This produces the difficulty that, first, only small environments or surrounds are to be used for the calculation of a motion vector in regions having motion vectors that are highly dependent on location and second, large environments or surrounds are required in regions having image contents that are not clearly structured, such being required in order to be able to unambiguously recognize the motion. It is therefore necessary to vary the size of the respective environments, and an assumption of a defined smoothness of the motion vector field must also be utilized in order to obtain motion vectors useable for the above applications even in the use of grainy noise-infested image frames, and in picture details that have little differentiation.

Essentially three different approaches to motion vector estimation have been previously investigated, cf., for example, H. G. Musmann, P. Pirsch, H.-J. Gallert, "Advances in Picture Coding", Proc. IEEE 73 (1985) 4, Pages 523–548, namely, (1) Block matching method,
(2) Differential method,
(3) Methods that work with distinctive points.

The operations of these methods shall be set forth briefly below for the case in which the shift of the picture contents in comparison to the predecessor picture (Picture A) is to be identified for a picture (for example Picture B of a picture sequence).

BLOCK MATCHING

In block matching methods, the picture for which the motion vectors are to be determined is subdivided into square or rectangular blocks having a constant size, i.e. having a prescribed plurality of picture elements (frequently 16×16 or 8×8), cf., for example, C. M. Lin, S. C. Kwatra, "Motion Compensated Interframe Color Image Coding", Proc. Int. Conf. On Communications, 1984, Vol. 1, Pages 516–520; and H. Brusewitz, P. Weiss, "A Video-Conference System At 384 kbit/s", Picture Coding Symposium, Tokyo, Abstracts, Page 212, 1986. The same motion vector is determined for all picture elements in a block, namely, in accord with the assumption that the motion in the small picture detail that corresponds to a block is approximately constant.

The motion vector for a block in image frame B is thereby determined in that that for a plurality of possible motion vectors in a prescribed value range, the respective block in image frame A that contains the picture elements from image frame A, displaced by the motion vector, is respectively extracted and one block from the plurality of these blocks is selected that exhibits the least difference in comprison to the given block in image frame B. The difference between two blocks in image frame A and image frame B is thereby expressed with a suitable distancing dimension, namely, for example, the sum of the squares (L2-norm) or the sum of the absolute values (L1-Norm) of the picture element differences. That motion vector for which the two blocks from image frame A and image frame B comprise the least distance, is accepted into the motion vector field sought.

As initially set forth, the problem is in selecting the suitable block size: given excessively large blocks, the motion vector field becomes too course and imprecise because the assumption of constant motion in the individual blocks no longer applies; given excessively small blocks, the picture content is frequently too undifferentiated in order to allow the correct subject motion to be recognized. The publication by G. Kummerfeldt, F. May, W. Wolf, "Coding Television Signals At 320 and 64 Kbit/s", Image Coding, M. Kunt, T. S. Huang, Editors, Proc. SPIE 594, Pages 119–128, 1985 makes the attempt to resolve the problem of incorrectly estimated vectors in blocks having ambivalent image content by subsequent combination and smoothing of motion vectors of a plurality of blocks that are classified as belonging to one subject. The results, however, have shown that this approach effects an improvement of the motion vector field only in cases of overall motion of the image content which is extremely simple to describe, such as "camera zoom" without additional subject movements—in this case, for utilization in motion-adaptive prediction in picture data compression.

DIFFERENTIAL

In the differential methods, cf., for example, P. Robert, C. Cafforio, F. Rocca, "Time/Space Recursions For Differential Motion Estimation", Image Coding, M. Kunt, T. S. Huang, Editors, Proc. Spie 594, Pages 175–185, 1986, the assumption of a constant motion for a block of neighboring picture elements is abandoned and a separate motion vector is determined for every picture element instead. To this end, specific model parameters are calculated for every picture element, these describing the local evolution of the picture signal in the environment of the picture element; and conclusions regarding the underlying motion, i.e. the shift of the image contents relative to one another, are drawn from these parameters as well as from the difference in the picture contents between image frame A and B at the location of the picture element under consideration. Since the estimate of the motion is usually only an approximative solution at first, the procedure is iteratively continued until no further improvement of the motion vector can be made.

One problem in this method is that the description of the picture content with model parameters is valid only within narrow limits; and fails, for example, in the case of great shifts between image frame A and image frame B. Further, the environment or surround of the picture element is co-employed for the calculation of the model parameters for a picture element, whereby the uniformity of the motion in this environment or surround is again assumed, so that the selection of the size of this environment or surround raises the same problems as in the selection of the block size in block-matching methods. In that the environments of the picture elements mutually overlap, vector fields are produced that change only little from one picture element to the next, and therefore do not correctly reproduce discontinuities in the motion such as occur at subject boundaries.

The publication by B. K. P. Horn, B. G. Schunck, "Determining Optical Flow", Artificial Intelligence 17, pages 185–203, 1981, discusses the question how these differential methods can see to it that meaningful motion vector fields largely agreeing with reality can also be determined in uniform picture regions that do not allow any unambiguous motion recognition. It is proposed that a term be incorporated into the objective function that is to be minimized, this term expressing the unsmoothness of the arising motion vector field. Due to the configuration of this component of the performance function measuring the unsmoothness of the motion vector field—the quadratic norm of what is referred to as the "Laplacian" of the vector field is measured, particularly because this yields an analytic function that is simple to mathematically manipulate, problems arise at subject boundaries in this method in that discontinuities in the motion vector field are erroneously suppressed.

DISTINCTIVE POINTS

In the third type of method, an attempt is made to avoid the problem that the actual subject motion can frequently not be unambiguously recognized from the local picture content. Distinctive points ("gray scale corners") or lines (brightness edges) are first sought in the picture and a motion vector is determined only for these points or along the lines, cf., for example, R. Lenz, "Estimation of 2-D General Motion Parameters in TV Scenes", Proc. 7th Int. Conf. Pattern Rec., Montreal, Canada, 30 July through 2 Aug. 1984, Vol. 1, pages 546–548; and C. J. Radford, "Optical Flow Fields in Hough Transform Space", Pattern Recognition Letters 4, pages 293 through 303, 1986. The motion vector field for the remainder of the picture elements must then be interpolated with suitable means from the established motion vectors. What is problematical in this method is the reliable locating of the distinctive points or lines for which the motion vectors are determined first, as is the segmenting of the picture into regions having uniform motion that can be determined from the given vectors of the distinctive points or lines by interpolation. Due to the difficulties of these sub-tasks, these methods are suitable practically only for image sequences having rigid bodies such as, for example, vehicles, but are not suitable for processing scenes having moving persons as frequently occur in image data compression.

Smoothing operators have also been developed for these methods, cf., for example, H. H. Nagel, W. Enkelmann, "An Investigation Of Smoothness Constraints For the Estimation Of Displacement Vector Fields from Image Sequences", IEEE Trans. Pattern Analysis and Mach. Intell., PAMI-8/5, Pages 565 through 593, September 1986; namely, again based on the quadratic norm of an unsmoothness function derived from the motion vector field. Since the known problems at subject boundaries thereby arise, this article proposed that a "Directed Smoothness Demand" be erected that is intended to effect a smoothing of the motion vector field, only in a direction perpendicular to the gradient of the luminance in the appertaining picture. The method resulting therefrom, however, is extremely involved.

SUMMARY OF THE INVENTION

The principal object of the present invention is to create a new method of the species initially cited, by means of which motion vector fields can be determined from an established image sequence, whereby special measures accomplish the result that the motion vector fields optimally reproduce the motion actually present in the picture.

This object is achieved by a method for the determination of motion vector fields from digital image sequences that determines a motion vector field from two successive image frames, and relates a picture element of the other image frame to every picture element of the one image frame, whereby the relation is defined by a motion vector that reproduces the displacement of the picture elements relative to one another, and whereby all picture elements in a square or rectangular block of picture elements receive the same motion vector. Such method is inventively chracterized in that a determination of the motion vectors is implemented by minimization of a composite objective function that, first, takes into consideration the differences in the luminance values of the picture elements to one another in the two given image frames and, second, evaluates or weights the differences between adjacent or neighboring motion vectors, evaluating or weighting these with the assistance of a smoothing measure; and in that the minimization of this performance function is implemented such that, first, the motion vectors minimizing the performance function are determined given the restriction that the motion vectors are constant in blocks that are larger than the blocks ultimately desired, and that, subsequently, each of these blocks is subdivided into smaller blocks that are preferably of the same size until the desired block size is achieved, whereby the performance function is again minimized by variation of the motion vectors after every dimminution of the blocks.

The method of the invention proceeds on the basis of the principle of block matching set forth above, c.f. H. G. Musmann et al, as recited above, i.e. a motion vector is respectively determined for a block of picture elements by evaluating a performance function for a variety of possible vectors, and by a search for that motion vector that supplies the optimum of the performance function.

In order to overcome the problems set forth above, especially for the block matching method, the following new principles have been incorporated into the method of determining motion vectors of the present invention:

(1) In order to obtain a motion vector field with high resolution that also describes the actual motion at subject boundaries with high precision, the image frame is subdivided into small blocks of, for example, 4*4 picture elements (pixels), for each of which a motion vector is determined. For the purpose of overcoming the disadvantages of small blocks (viz., possibly ambivalent pictuire content that is not sufficiently characteristic), however, a determination of motion vectors for considerably larger blocks (for example, 16*16 or 32*32 picture elements) is first carried out in a first step of the method. These large blocks are subdivided into smaller blocks in further steps of the method, a separate motion vector being determined for respectively each of these, whereby the motion vectors of the large blocks serve as a starting point for decreasing block size.

(2) Instead of the usual objective functions of block matching methods, that only express the differences in the picture element values of the successive images frames, the method of the invention uses objective functions that also take the "smoothness" of the motion vector field into consideration on the basis of suitable auxiliary terms. In the first step of the method, upon initialization of the motion vector field having a large block size, the length of the individual motion vectors is first co-involved in the objective function to be minimized. In the sequential steps of the method, the differences of "neighboring" motion vectors, i.e. the motion vectors of neighboring blocks, are introduced into the objective function. A smoothing of the motion vector field and a suppression of determination errors that appear as "mavericks" can be effected by this type of objective function, namely, even in the determination of the motion of subjects that change in shape, such as, for example, persons.

(3) The problems at object edges where discontinuities in the motion vector field are possible, these problems arising in the other methods (differential methods and the methods working with distinctive points) in combination with smoothing measures, are avoided in the block matching method of the invention in that the smoothness function that measures the differences of neighboring motion vectors is not based on the quadratic norm but on the absolute value norm of the differences. The effect is similar to a median filtering of the motion vector field, in which pronounced discontinuities in the motion vector field are likewise preserved, and only "mavericks" are suppressed. This smoothness measure therefor also enables the correct determination of motion vector fields at subject edges.

(4) The method can be specifically employed in such fashion in picture coding for the picture data compression that only larger blocks are initially used at the transmission side and the appertaining motion vectors are transmitted eg. over a transmission line, to the receiver. These motion vectors are used for motion-compensating prediction of images in the transmitter (coder) and receiver (decoder). At the receiver side, in addition, the refining steps that are still missing for the motion vector field are iteratively executed with the assistance of the received pictures, until the desired, smallest block size is achieved. This motion vector field can then be used to interpolate missing frames of the image sequence that had been skipped at the transmitter for the purpose of data reduction.

DESCRIPTION OF THE DRAWINGS

The invention shall be set forth in detail below with reference to a number of drawings, in which.

DESCRIPTION OF THE PREFERRED EMBODIMENT

The method shall be set forth below with reference to a preferred exemplary embodiment for that case in which a motion vector field is determined from two images viz., frame A and frame B, whereby a uniform motion vector field is defined for respective blocks of 4*4 picture elements (pixels). The method initially begins with larger blocks that contain a plurality of small blocks. In the present example, blocks having the size 16*16 are used at the beginning.

Figure 1:
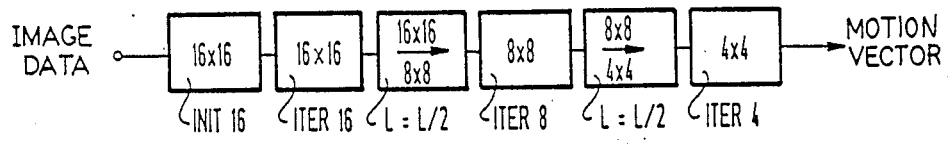
FIG. 1 shows a schematic illustration of the execution of the method for determining motion vectors for an ultimate block size 4*4 and a starting block size of 16*16.

The overall method execution then follows a pattern as shown in FIG. 1.

The method steps shall be set forth below.

Block-Matching 16*16 (INIT16)

The givens are the two successive frames A and B of a sequence that are composed of the picture elements $$a(k,h), k=1\ldots I, h=1\ldots J \qquad (1.1a)$$

and $$b(i,j), i=1\ldots I, j=1\ldots J \qquad (1.1b)$$

whereby i and k are the row indices and j and h are the column indices.

The goal of the overall method is the determination of a motion vector field $X(i,j)$, $$i=1\ldots I, j=1\ldots J. \qquad (1.1c)$$

Figure 2:
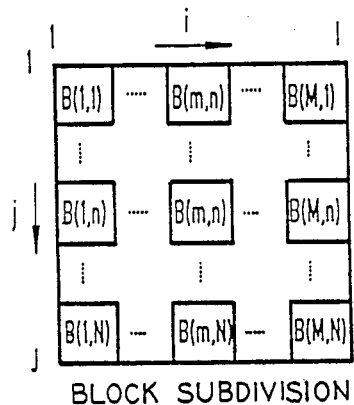
FIG. 2 shows a schematic illustration of a block subdivision to be carried out.

The frame B is now subdivided into blocks $$B(m,n), \text{ with } m=1\ldots M, n=1\ldots N \qquad (1.2)$$

each of which contains $16 \times 16$ picture elements $b(i,j)$, as shown in FIG. 2.

A preliminary motion vector $$X16(m,n) = [x16(m,n), y16(m,n)] \qquad (1.3)$$

serving as auxiliary is now identified for every block $X16(m,n)$. This motion vector is composed of two components, namely, the horizontal displacement $x16(m,n)$ and the vertical displacement $y16(m,n)$.

On the basis of this motion vector $X16(m,n)$ every picture element $b(i,j)$ in the block $B(m,n)$ has a picture element $a(k,h)$ from frame A allocated to it, namely on the basis of the linking $$k=i+x16(m,n) \text{ and} \qquad (1.4a)$$

$$h=j+y16(m,n), \qquad (1.4b)$$

i.e. the coordinates $[k,h]$ of the picture element $a(k,h)$ that is allocated to the picture element $b(i,j)$ result from addition of the displacement or motion vector $X16(m,n)$ to the coordinates $[i,j]$.

For the calculation of $X16(m,n)$ the "displaced frame difference" $d(i,j,r,s)$ defines:

$$d(i,j,r,s) = b(i,j) - a(i+r, j+s), \qquad (1.5)$$

i.e. the difference compared to the corresponding picture element from frame A displaced by a motion vector $[r,s]$, is defined for every picture element (pixel) $b(i,j)$ in the block $B(m,n)$ and for every motion vector $[r,s]$.

The absolute values of the differences $d(i,j,r,s)$ within the block $M(m,n)$ are then summed up, as a result whereof the L1-norm (absolute value norm) $D16(m,n,r,s)$ of the "Displaced Frame Difference" for the block $B(m,n)$ and the motion vector $[r,s]$ is produced:

$$D16(m,n,r,s) = SUM \, abs \, (d(i,j,r,s)). \qquad (1.6)$$

i,j in B(m,n)

As a first measure for smoothing the motion vector fields, a "penalty term" (penalty) $P16(r,s)$ is now also added to this sum $D(m,n,r,s)$, this evaluating or weighting the length of the motion vector $[r,s]$ $$D16'(m,n,r,s) = D16(m,n,r,s) + P16(r,s) \qquad (1.7a)$$

whereby $$P16(r,s) = 256 \times \beta B \times (abs(r) + abs(s)) \qquad (1.7b)$$

applies.

The "penalty term" is thus composed of the L1-norm of the motion vector, multiplied by a control parameter $\beta$ and by the number of picture elements in a block, namely, 256. The parameter $\beta$ can be used to determine how greatly the length of the motion vector enters into the objective function $D16'(m,n,r,s)$. (A typical value of $\beta$ that has proven itself in simulation experiments is $\beta = 1.0$).

The minimum of $D16'(m,n,r,s)$ is then identified by variation of $[r,s]$ in a pre-established value range S, whereby the sought motion vector $X16(m,n) = [x16(m,n), y16(m,n)]$ derives at:

$$D16'(m,n,x16(m,n),y16(m,n)) = \min D16'(m,n,r,s) \qquad (1.8)$$

r,s in S

A quadratic value range is usually selected for S, for example the set of all motion vectors $[r,s]$ for which the maximum absolute value of the two components r and s does not exceed an upper limit.

What is achieved by the addition of the "penalty term" that represents a modified smoothness measure to $D(m,n,r,s)$ is that short motion vectors are prioritized in uniform image regions, or at straight edges, where the motion cannot be unambiguously determined from the local picture content (no clear minimum of $D(m,n,r,s)$). The probability of the appearance of "mavericks" in the motion vector field is, thus, already reduced.

For $\beta = 1.0$, for example, a motion vector $[r,s] = [0,1]$ must yield a "displaced frame difference" $d(i,j,r,s)$ that is lower on average by at least 1.0 so that it is privileged over the zero vector $[r,s] = [0,0]$. The analogous case applies to larger motion vectors.

Since a full search is usually too time-consuming, the value range S is best initially limited to a plurality of samples $[r,s]$ in a fixed grid (for example, grid constant of 4) and further searching is subsequently carried out in the environment of the optimum ("three step search", c.f., for example, H. G. Musmann, P. Pirsch, H. J. Grallert: "Advances in Picture Coding", Proc. IEEE 73 (1985) 4, Pages 523-548. In this case, the hit reliability of the method can be increased in that the search for the optimum motion vector is partly carried out in lowpass-filtered image frames. A subsampling of the image frame can be combined with this in order to reduce the complexity of the apparatus required.

This first step of the method for the determination of the motion vector thus represents a known block matching method that, however, has been modified by the introduction of the "penalty term" P16 (r,s) according to equation 1.7a, b for the purpose of smoothing the motion vector fields.

Iterative Improvement of the Motion Vector Field By Relaxation In The Case Of Block Size 16 (ITER 16)

Figure 3:
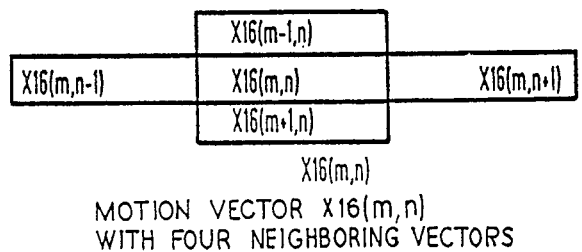
FIG. 3 shows an illustration of a motion vector X16(m,n) with the motion vectors of the four neighboring blocks.

After the determination of the preliminary motion vectors X16(m,n) for all blocks B(m,n), as set forth above, an iterative improvement of this motion vector field (relaxation) is carried out. To that end, a new "penalty term" or, respectively, a new smoothness measure P16'(m,n,r,s) is defined with whose assistance the deviation of the motion vectors X16(m,n) from their respectively four neighboring motion vectors X16(m−1,n), X16(m+1,n), X16(m,n−1) and X16(m,n+1) is measured, as shown in FIG. 3.

The smoothness measure P16'(m,n,r,s) is defined by:

$$P16'(m,n,r,s) = abs(r - x16(m - 1,n)) + \qquad (2.1)$$

$$abs(s - y16(m - 1,n)) + abs(r - x16(m + 1,n)) +$$

$$abs(s - y16(m + 1,n)) + abs(r - x16(m,n - 1)) +$$

$$abs(s - y16(m,n - 1)) + abs(r - x16(m,n + 1)) +$$

$$abs(s - y16(m,n + 1)) * \alpha * 16$$

in which r and s are the components of a motion vector [r,s] that is to be introduced as new motion vector X16(m,n) for the block B(m,n).

The smoothness measure P16'(m,n,r,s) thus represents the sum of the absolute value norms (L1-norms) of the four difference vectors between X16(m,n) and its neighbors, multiplied by a control parameter "α" and the side length of a block, namely, 16. The degree of the smoothness of the motion vector field in the relaxation step can be monitored or controlled with the control parameter "α". The L1-norm was selected since edges in the motion vector field, which occur at subject edges, are preserved with it, in contrast to the "quadratic norm" (L2-norm) that privileges continuous transitions.

A new performance function D16"(m,n,r,s), namely:

$$D16''(m,n,r,s) = D(m,n,r,s) + P16'(m,n,r,s) \qquad (2.2)$$

is formed from the smoothness measure P16'(m,n,r,s) and from the "displaced frame function" D16(m,n,r,s) (Equation 1.6).

A smoothing of the motion vector field is now carried out in that the motion vector field determined according to equation 1.8 (without proximity relationships) first forms the basis and, proceeding from this, a new, optimum motion vector X16(m,n) is determined step-by-step for one block after the other, namely, by means of $$X16(m,n) = [x16(m,n), y16(m,n)] \qquad (2.3a)$$

so that $$D16''(m,n,x16(m,n), y16(m,n)) = min\ D16''(m,n,r,s)$$

$$r,s\ in\ S(m,n) \qquad (2.3b)$$

In order to limit the search complexity (and as a further measure for smoothing the vectors), the value range S(m,n) for every block is thereby adaptively designed, namely, such that the search is all the more inclusive the more different the motion vectors X16(m,n)=[x16(m,n), y16(m,n)] and their respectively neighboring motion vectors are:

$$S(m,n) = [rmin \ldots rmax, smin \ldots smax] \qquad (2.4a)$$

with $$rmin = min(x16(m,n), x16(m - 1,n), x16(m + 1,n), \qquad (2.4b)$$

$$x16(m,n - 1), x16(m,n + 1))$$

$$rmax = max(x16(m,n), x16(m - 1,n), x16(m + 1,n),$$

$$x16(m,n - 1), x16(m,n + 1))$$

$$smin = min(y16(m,n), y16(m - 1,n), y16(m + 1,n),$$

$$y16(m,n - 1), y16(m,n + 1))$$

$$smax = max(y16(m,n), y16(m - 1,n), y16(m + 1,n),$$

$$y16(m,n - 1), y16(m,n + 1))$$

Only those motion vectors [r,s] for which:

$$rmin \leq r \leq rmax\ and\ smin \leq s \leq smax.$$

are valid and investigated.

In regions having a constant motion vector that also crosses over the block boundaries, rmin=x16(m,n)=rmax and smin=y16(m,n)=smax, apply, so that the value range shrinks to one point and no search expenditure arises. Improvement is sought only given the presence of discontinuities and other divergences and "mavericks" in the motion vector field.

After an improvement of the vector X16(m,n) has been sought once for all blocks B(m,n), the operation must be repeated again for all those blocks B(m,n) for which at least one of the four neighboring motion vectors X16(m−1,n), etc., changed in the preceding pass. An iterative process results therefrom, and this is continued until none of the motion vectors X16(m,n) can be improved anymore, namely, while keeping the four neighbors constant.

As a rule, about 5 through 10 iterations suffice, namely, dependent on the degree of motion in the picture, whereby it must be taken into consideration that all blocks have to be actually checked only in the first iteration and only those blocks then have to be checked subsequently in whose proximity changes continued to occur in the most recent pass.

The fact that the smoothness measure P16'(m,n,r,s) (Equation 2.1) is based on the L1-Norm of neighboring vectors and not, for instance, on the L2-Norm, leads to the fact that edges are preserved in this smoothing process, similar to median filtering. In fact, of course, the median value of a set of numbers is that value which minimizes the sum of the absolute values of the differences, i.e. the sum of the L1-Norms. The smoothing set forth above on the basis of minimizing D16"(m,n,r,s) can therefore also be interpreted as a generalized median filtering of the motion vectors that takes the "displaced frame differences" into consideration.

A local optimum of the overall performance function Z has now been achieved, this deriving by summation of D16″(m,n,r,s) over all blocks B (m,n) in the frame, i.e., what is valid for Z is:

$$Z = Z1 + \alpha Z2, \quad (2.5)$$

whereby $$Z1 = \text{SUM } d(i,j,x(i,j), y(i,j)) \quad (2.6)$$

i,j in the frame with d(i,j,x(i,j),y(i,j)) according to equation (1.5), and $$Z2 = \underset{i,j}{\text{SUM}} (|x(i,j) - x(i-1,j)| + |y(i,j) - y(i-1,j)| + \quad (2.7)$$

$$|x(i,j) - x(i+1,j)| + |y(i,j) - y(i+1,j)| +$$

$$|x(i,j) - x(i,j-1)| + |y(i,j) - y(i,j-1)| +$$

$$|x(i,j) - x(i,j+1)| + |y(i,j) - y(i,j+1)|).$$

The values x(i,j) or, respectively, y(i,j), etc., are thereby the components of the motion vectors X(i,j), that derive from the motion vector field X16(m,n) in that all picture elements b(i,j) in the Block B (m,n) are assigned the same motion vector X16(m,n):

$$X(i,j) = [x(i,j),y(i,j)] = X16(m,n) \text{ when } b(i,j) \text{ in } B(m,n). \quad (2.8)$$

Subsequently, the motion vector field is further optimized—i.e. the performance function Z is further minimized—in that the size of the blocks in which the motion vector field is assumed to be uniform is halved.

Block Division of 16×16 to 8×8 picture elements (L=L/2)

A new motion vector field [X8(p,q)] for the 8×8 pixel blocks B8(p,q) is produced from the established motion vector field [X16(m,n)] for the 76×76 pixel blocks, this new field being composed of the motion vectors $$X8(p,q) = [x8(p,q), y8(p,q)] \quad (3.1)$$

To that end, all blocks of 16×16 pixels are each subdivided into four blocks of eight by eight pixels and each of the sub-blocks is first assigned the same motion vector, namely, that of the block of 16. This new motion vector field serves as given for the next relaxation step.

Iterative Improvement of the Vector Field By Relaxation In The Case of Block Size 8 (ITER 8)

This method step exactly corresponds to the relaxation step for block size 16 as set forth above, but with the modification that "16" in the equations for the objective function is to be replaced by "8". An objective function D8″(p,q,r,s) corresponding to D16″(m,n,r,s) is thus minimized according to equation 2.2, this containing a smoothness measure P8′(p,q,r,s) as in equation 2.1. The same value as in the case of block size 16 can be employed here for α (see Equation 2.1).

Block Subdivision From 8×8 to 4×4 Picture Elements (L=L/2)

As in the block subdivision from 16×16 down to 8×8 picture elements, the motion vectors that were determined for blocks having the size 8×8 are now distributed onto four respective blocks having 4×4 picture elements.

Iterative Improvement Of the Vector Field Given Block Size 4 by Relaxation (ITER 4)

This method step exactly corresponds to the relaxation steps for block sizes 16 and 8.

The method steps of "block subdivision" and "relaxation" can be continued down to the block size of 1×1 picture element; however, a resolution of the motion vector field having a motion vector of respectively 4×4 picture elements is adequate for many applications.

General Block Circuit Diagram

Figure 8:
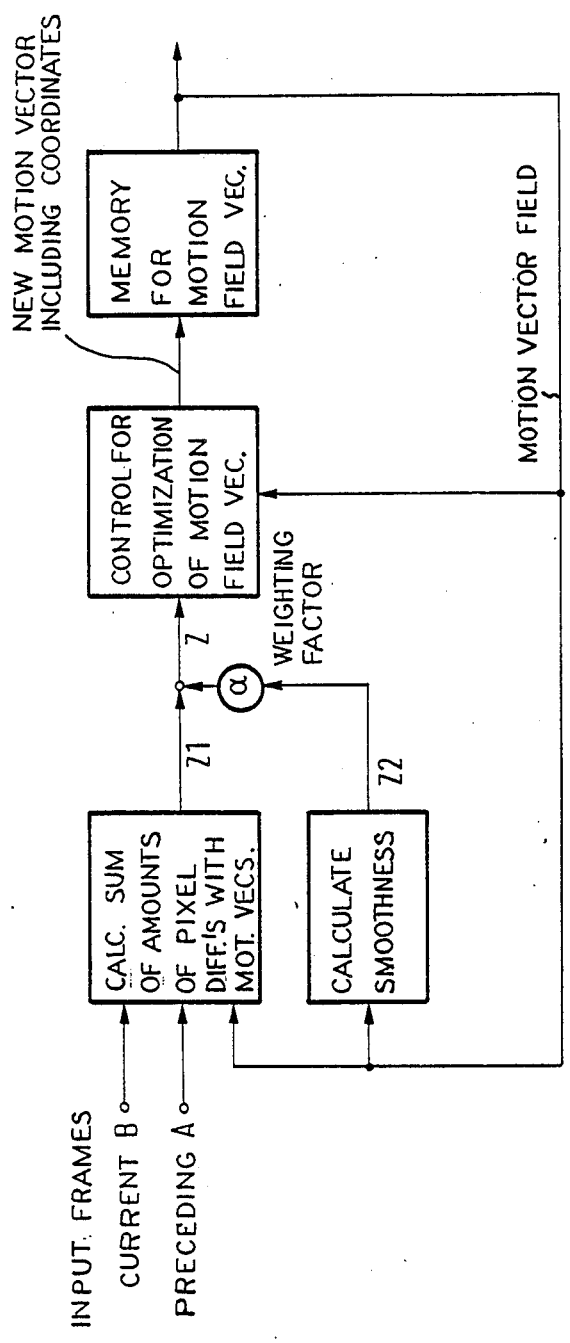
FIG. 8 shows an illustration of the method for the determination of motion vectors that is similar to a block circuit diagram.

FIG. 8 shows a functional arrangement with which the method for determining motion vectors set forth above can be implemented in principle.

Proceeding on the basis of two input frames A and B, the ultimate motion vector field is determined in a succession of variations of the motion vector field, taking the respective values of the performance function Z into consideration.

Determination of Motion Vectors For the Insertion of Intermediate Images (Image Interpolation)

The above-described method can also be utilized for the determination of motion vector fields for image interpolation. To this end, the values that measure the "displaced frame differences", namely D16(m,n,r,s) (Equation 1.6) and the corresponding values for the blocks having the sizes 8*8 and 4*4 merely have to be somewhat modified.

When, for example, exactly one intermediate image is to be inserted, for example, between the given frames A and B by motion-adaptive interpolation such that moving subjects in the interpolated image have moved by exactly one-half of the displacement from frame A to frame B, then the new quantity D16i(m,n,r,s), derives instead of D16(m,n,r,s) in equation 1.6, whereby i stands for interpolation:

$$D16i(m,n,r,s) = \text{SUM } abs (d'(i,j,r,s)) \quad (7.1)$$

i,j in B(m,n)

with $$d'(i,j,r,s) = b(i-r/2, j-s/2) - a(i+r/2, j+s/2) \quad (7.2)$$

The motion vector [r,s], is thus now not completely applied to the frame A, but is only half applied to frame A and half to frame B, with inverted operational sign, so that, overall, frame A and frame B are again mutually shifted relative to one another by the full motion vector [r,s].

The analogous case also applies to the interpolation by higher factors than 2, i.e. in case two or more frames are to be inserted between the given frames A and B. In general, the displacement [t*r, t*s] is applied to frame A and the displacement [(t−1)*r,(t−1)*s] is applied to frame B, namely, with 0<t<1.

In case the displacement does not lead to whole-numbered picture element coordinates, rounding is required.

Division of the Determination of Motion Vectors Onto Transmitter (Coder) and Receiver (Decoder) For Moving Picture Coding In a moving picture coding method, the determination of the motion vectors is used for two purposes:
(1) Motion-compensating prediction at transmitter and receiver (2) Motion-adaptive interpolation of missing frames at the receiver.

A determination of motion vectors is thereby necessary at the transmission side in order to determine the motion vectors for the motion-compensating prediction. Since these motion vectors must be transmitted, the motion vector field cannot be arbitrarily refined herein. These motion vectors, however, can also be utilized for motion-compensating interpolation at the receiver in addition to being utilized for prediction provided that a finer motion vector field is previously acquired from the transmitted motion vector field and from the transmitted frames present at the receiver side.

Figure 9:
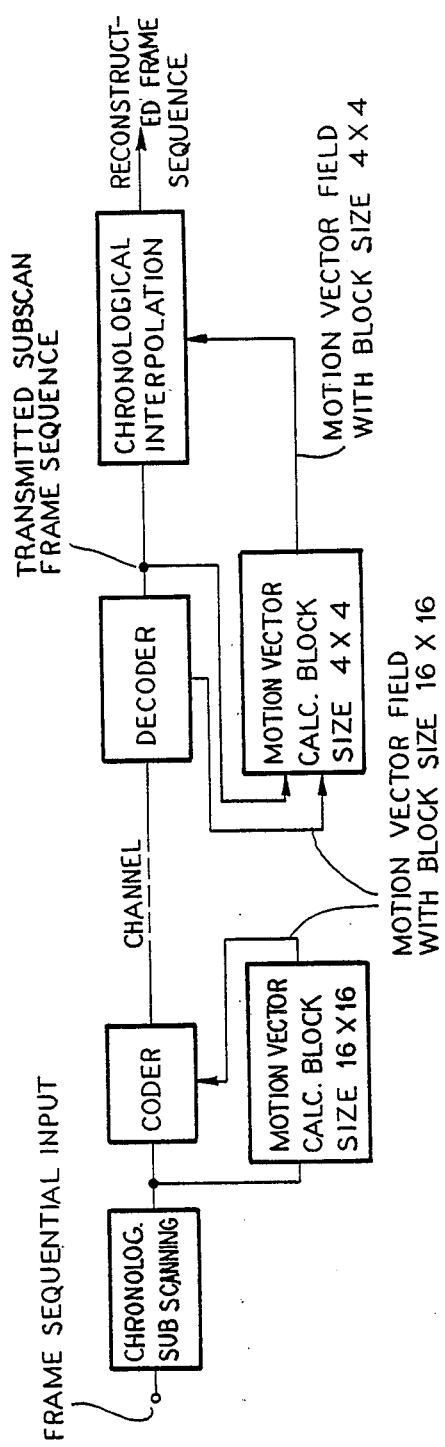
FIG. 9 shows a block circuit diagram for an image sequence transmission arrangement that contains apparatus for the implementation of the method of the invention.

The above-described, multi-stage method (See FIG. 1) can therefore be used in such fashion for application in image sequence coding that the method steps "initialization with block size 16*16" as well as "iterations with block size 16" are carried out at the transmitter side and the remaining method steps ("block sub-division" and "iterations" for blocks of 8 and blocks of 4) are carried out at the receiver, c.f. FIG. 9.

It has been shown in simulation experiments that the motion vector field acquired at the transmitter side for motion-compensating prediction is in fact suitable as a prescription for a refining at the receiver side for the purpose of interpolation, whereby the "displaced frame difference" $D16(m,n,r,s)$ from Equation 1.6 is employed at the transmitter side and the function $D16i(m,n,r,s)$ (Equations 7.1, 7.2) or, respectively, its corresponding forms for smaller blocks, adapted to the interpolation, are employed at the receiver side.

The execution of the method for determining motion vectors that was set forth above is illustrated by the flow charts shown in FIGS. 4–7.

Figure 4:
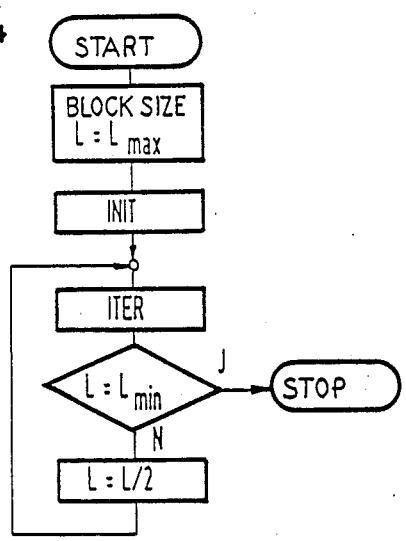
FIG. 4 shows a flow chart for the overall execution of the method.
Figure 5:
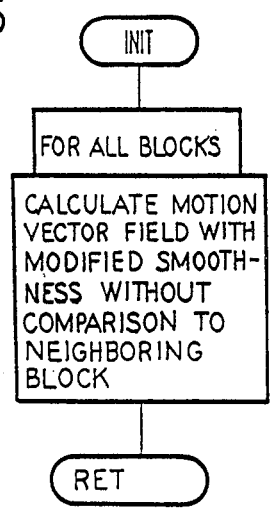
FIG. 5 shows a first sub-flow chart that illustrates the execution of the initialization of the method.

FIG. 4 represents the overall programming flow chart of the method wherein it is shown that an initialization (INIT) of the vector field first occurs with the maximum block size $L=L_{max}$ and that, following thereupon, an iterative improvement (ITER) occurs for all block sizes from $L_{max}$ through $L_{min}$—whereby the block side length L is respectively halved. The execution of the initialization (INIT) is shown in FIG. 5. The motion vector that minimizes the objective function with modified smoothness measure is determined here for all blocks $B(m,n)$.

Figure 6:
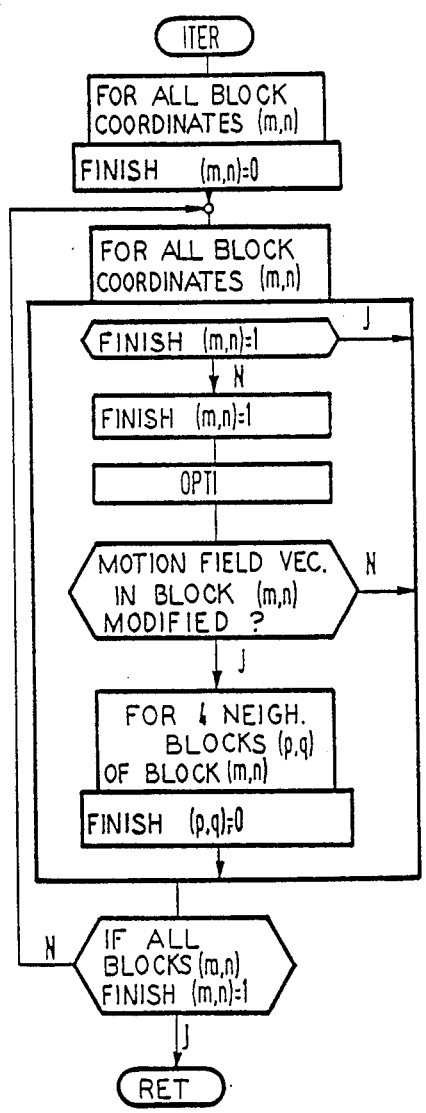
FIG. 6 shows a second sub-flow chart that illustrates the execution of the iteration steps within the method.
Figure 7:
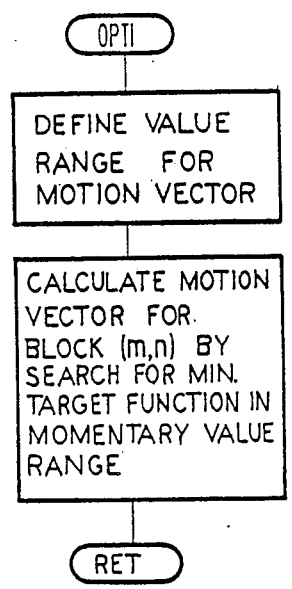
FIG. 7 shows a third sub-flow chart that illustrates the execution of an optimization procedure within the method.

The iterative improvement (ITER) follows the programming flow chart according to FIG. 6. The logging field FINISH $(m,n)$ exists here, this indicating for every block $B(m,n)$—having the respective block size L—whether the block is still to be processed—i.e. FINISH$(m,n)=0$—or whether it is already situated in a local optimum (i.e., minimum) of the objective function—i.e. FINISH$(m,n)=1$. First, the FINISH field is set to 0 for all blocks. In the following loop, the minimum of the objective function is sought in a defined value range (OPTI), as shown in FIG. 7, being respectively sought for all blocks that do not yet have the "FINISH" equal to non-zero. FINISH$(m,n)=1$ is set for all of these blocks. In case the motion vector of the block has changed in the minimum search, the FINISH field for the neighboring blocks is set to 0 so that these are processed again. When all blocks have the value FINISH$(m,n)=1$, the iteration sequence has been ended.

FIG. 7 shows the execution of the optimization step (OPTI) that is carried out in ITER.

In summary, it is to be pointed out that the subdivision of the blocks is respectively preferably executed by halving the edge lengths of the blocks. Upon insertion of an intermediate image between the two frames, two picture elements, namely, one from the first frame and one from the second frame, are allocated to every picture element of this intermediate image. The differences in the luminance values of mutually corresponding picture elements of the two successive frames within a block of picture elements are evaluated or weighted by means of the sum of the absolute values of the differences of the luminance values and are used as addends in the performance function that is to be minimized, whereby these addends form a first component of the objective function. The differences of the luminance values of mutually corresponding picture elements of the two successive frames within a block of picture elements can also be evaluated or weighted by means of the sum of the squares of the differences of the luminance values and can be used as addends in the objective function to be minimized, whereby these addends form a first component of the performance function.

The method of the invention also provides that the differences between neighboring motion vectors are expressed by the absolute value norms of these differences, whereby the sum of these absolute value norms forms a second component of the objective function and is used as smoothness measure. At least one of the two components is multiplied by a weighting factor and the corresponding products form the objective function by summation, whereby the objective function preferably has the form $Z=Z1+\alpha Z2$, whereby Z1 is the first component, Z2 is the second component and $\alpha$ is the weighting factor.

In the preferred exemplary embodiment, only those four neighboring motion vectors are used as neighbors of every motion vector whose coordinates are horizontally and vertically situated in proximity to the coordinates of the appertaining motion vector, i.e. that their coordinates differ from the coordinates of the appertaining motion vector by (0,1), (0,−1), (1,0) or (−1,0).

In the initialization of the motion vector field with large blocks—preferably 16×16 picture elements (pixels)—, namely, as long as a motion vector was not calculated at least once for every block, the smoothness measure is modified to the effect that the absolute value norms of the motion vectors to be optimized—multiplied by a weighting factor—are used in the objective function by means of the smoothness measure instead of the differences between neighboring motion vectors.

In every stage of the block subdivision, i.e. at the beginning given the maximum block size and, following thereupon, after every block sub-division that is preferably carried out down to a block size of 4×4 picture elements (pixels), every individual motion vector is optimized by variation in an appertaining value range in succession, until a smaller value of the objective function can no longer be found for any motion vector in this way.

The value range of the motion vector within which the individual motion vectors are varied, in order to minimize the performance function, is made dependent on which values the motion vectors have in the motion vector field that has already been calculated, so that the value range for the optimization of the motion vector field is small when neighboring motion vectors are the same or similar, and is only larger when neighboring motion vectors exhibit great differences compared to one another.

What is effected by a logging system, is that only those motion vectors are again optimized, in view of a possible minimization of the value of the performance function, whose neighboring motion vectors have changed since the most recent optimization of the appertaining motion vector, so that the smoothness measure may also have varied, whereby the logging system contains a logging field comprising a memory location per block for storing control information for the optimization sequence.

In the optimization of a specific motion vector, every motion vector of the appertaining value range need not necessarily be taken into consideration; rather, only a sub-set of the motion vectors need be taken into consideration according to a predetermined pattern.

In addition to the difference between neighboring motion vector fields to be calculated, the difference between the motion vectors of the current motion vector field and those of the motion vector field calculated immediately before from a preceding pair of successive frames, can be determined and used in the smoothness measure, namely, for the purpose of smoothing the motion vector field in the direction of the time axis, i.e. for matching successive motion vector fields.

The method of the invention can also be applied in instances wherein motion vector fields for the purpose of inserting intermediate images are calculated from respectively two successive frame transmitted with data compression from a coder via a channel to a decoder, namely, such that corresponding motion vector fields that had already been previously transmitted are used for the initialization of the method.

A complete program listing 42 pages in length (p1 .. . p42) may be found in the appendix hereto, which is incorporated herewith by reference, this reproducing the entire method execution of the invention for a preferred programming example in the FORTRAN programming language.

It will be apparent that various modifications and/or additions may be made in the apparatus of the invention without departing from the essential feature of novelty involved, which are intended to be defined and secured by the appended claims.

```
C*****************************************************************************
C
C         PROGRAM M6EST3S                PROGRAM LISTING, page -P1-
C
C   V.BRANDT       06.02.87
C   LAST UPDATE    24.03.87
C
C   THREE STEP MOTION ESTIMATION.
C   18.03.87:  NUN AUCH FUER MOTION COMPENSATED INTERPOLATION.
C              EXTRA FULL SEARCH SUBROUTINE ENTFERNT.
C   24.03.87:  BEI INTERPOLATIONERHOEHUNG 2D VEKTORFELDER.
C
C   MAN MUSS DAS PROGRAMM LINKEN MIT DEN BIBLIOTHEKEN
C      DRB2:[BR.P]LIB1/LIB, DRA0:[PUBLIC]INFO/LIB
C
C*****************************************************************************

CHARACTER  KEYS*20, CHAR*60, NAME50*50, PROGRAM*30, NAMASK*50
         DATA PROGRAM /'M6EST3S'/

6001     FORMAT(X,I8,2X,A40)
6021     FORMAT(I8)
6023     FORMAT(A30)
  24     FORMAT(F8.3)
5000     FORMAT(A50)

KIN = 11               ! Z.B. 11
         KIM = 12               ! FUER DIE KLEINE MASKE.

KOM = 16               ! VERSCHOBENES ERGEBNISBILD
         KOV = 15               ! AUSGABE VEKTOREN ALS LUMINANZBILDER.

C  OEFFNEN EINGABEDATEI:

CALL PICOLD (KIN, NSE,NZE,NBILD,NUV,IPIC1, NAME50)
         IF (NUV.NE.1) THEN
           STOP 'M3S_1: FARBE NICHT SUPPORTED !!!'
         ENDIF

WRITE(6,*) 'VEKTOREN-ABSTAND HORIZONTAL: LGRIDS:'
         READ(5,*) LGRIDS
```

```
      WRITE(6,*) 'VEKTOREN-ABSTAND VERTIKAL: LGRIDZ:'
      READ(5,*) LGRIDZ
      WRITE(6,*) 'BEWEGUNGSKOMPENSIERTES BILD AUSGEBEN (0/1)?:'
      READ(5,*) JAMCOUT

WRITE(6,*) 'INTERPOLATIONSFAKTOR MIPO:'          ! NEU
         READ(5,*) MIPO
         NBOU = NBILD*MIPO                ! NEU 24.03.87

NSV = NSE/LGRIDS
      NZV = NZE/LGRIDZ           ! GROESSE DES KLEINEN VEKTORBILDES.
      NZV2 = NZV*2

C AUSGABEDATEI:

WRITE(6,*) '--> VEKTOREN ALS KLEINES LUMINANZBILD:'
         CALL PICNEW (KOV, NSV, NZV2, NBOU,NUV)
      IF (JAMCOUT.EQ.1) THEN
         WRITE(6,*) '--> BEWEGUNGSKOMPENSIERTES ERGEBNISBILD:'

APPENDIX

CALL PICNEW (KOM, NSE,NZE,NBOU,NUV)
      ENDIF

C MASKE?

WRITE(6,*) 'MIT CHANGED/UNCHANGED-MASKE ARBEITEN? (0/1):'
      READ(5,*) JAMASK
      IF (JAMASK.EQ.1) THEN
       CALL PICOLD (KIM, NSM,NZM,NBILDM,NUMV,IPICM1, NAMASK)
      ENDIF

C PARAMETER:

KEYS = 'M3S_1_PROGRAM'
         WRITE(CHAR,6023) PROGRAM
         CALL KEYWR(KOV,KEYS,CHAR,3)
      KEYS = 'M3S_1_QUELLE'
         WRITE(CHAR,5000) NAME50
         CALL KEYWR(KOV,KEYS,CHAR,3)
      IF (JAMASK.EQ.1) THEN
      KEYS = 'M3S_1_C/U-MASKE'
         WRITE(CHAR,5000) NAMASK
         CALL KEYWR(KOV,KEYS,CHAR,3)
      ENDIF
      KEYS = 'M3S_1_IPIC1'           ! NUMMER ERSTES BILD
         WRITE(CHAR,6021) IPIC1
         CALL KEYWR(KOV,KEYS,CHAR,3)
      KEYS = 'M3S_1_NPICIN'          ! ZD INPUT BILDER.
         WRITE(CHAR,6021) NBILD
         CALL KEYWR(KOV,KEYS,CHAR,3)

KEYS = 'M3S_LGRIDS'            ! HORI. VEKTORENRASTER
         WRITE(CHAR,6021) LGRIDS
         CALL KEYWR(KOV,KEYS,CHAR,3)
      KEYS = 'M3S_LGRIDZ'            ! VERT. VEKTORENRASTER
         WRITE(CHAR,6021) LGRIDZ
         CALL KEYWR(KOV,KEYS,CHAR,3)
      WRITE(6,*) ' MAXSUCH HORIZONTAL:'
         READ(5,*) MAXUS
         KEYS = 'M3S MAXUS'
         WRITE(CHAR,6021) MAXUS
         CALL KEYWR(KOV,KEYS,CHAR,3)
```

```
      WRITE(6,*) ' MAXSUCH VERTIKAL:'
        READ(5,*) MAXUZ
        KEYS = 'M3S_MAXUZ'
        WRITE(CHAR,6021) MAXUZ
        CALL KEYWR(KOV,KEYS,CHAR,3)
      WRITE(6,*) 'GENAUIGKEIT DER VEKTOREN "IFINE": 1, 2, ODER 4:'
        READ(5,*) IFINE
        KEYS = 'M3S_IFINE'
        WRITE(CHAR,6021) IFINE
        CALL KEYWR(KOV,KEYS,CHAR,3)
      WRITE(6,*) 'OBERGRENZE ITH1 FUER PIXEL:'
        READ(5,*) ITH1
        KEYS = 'M3S_ITH1'
        WRITE(CHAR,6021) ITH1
        CALL KEYWR(KOV,KEYS,CHAR,3)
      KEYS = 'M3S_MIPO'
        WRITE(CHAR,6021) MIPO
        CALL KEYWR(KOV,KEYS,CHAR,3)

IF (JAMASK.EQ.1.AND.MIPO.GT.1)
+       STOP 'MIPO & MASKE GIBTS NICHT.'

C     IF (MIPO.GT.1) THEN
C     WRITE(6,*) 'INTERPOLATIONSZAEHLER MIPCOU:'          ! NEU
C       READ(5,*) MIPCOU
C       KEYS = 'M3S_MIPCOU'
C       WRITE(CHAR,6021) MIPCOU
C       CALL KEYWR(KOV,KEYS,CHAR,3)
C     ENDIF   ! MIPO.GT.1

C     WRITE(6,*) 'FULLSEARCH(0)/THREESTEP(1):'
C       READ(5,*) JAFS3S
C       KEYS = 'M3S_JAFS3S'
C       WRITE(CHAR,6021) JAFS3S
C       CALL KEYWR(KOV,KEYS,CHAR,3)
C     IF (JAFS3S.EQ.1) THEN

WRITE(6,*) 'BEI 3_STEP ANF.-SCHRITTWEITE (ZAEHLER; 4, 2, 1):'
        READ(5,*) IFIZAE1
        KEYS = 'M3S_IFIZAE1'
        WRITE(CHAR,6021) IFIZAE1
        CALL KEYWR(KOV,KEYS,CHAR,3)
      WRITE(6,*) 'BEI 3_STEP ANF.-SCHRITTWEITE (NENNER; 4, 2, 1):'
        READ(5,*) IFINEN1
        KEYS = 'M3S_IFINEN1'
        WRITE(CHAR,6021) IFINEN1
        CALL KEYWR(KOV,KEYS,CHAR,3)
      WRITE(6,*) 'BEI 3_STEP FOLGE-MAXSUCH: (1, ODER AUCH 2,3,..):'
        READ(5,*) MAXUFOL
        KEYS = 'M3S_MAXUFOL'
        WRITE(CHAR,6021) MAXUFOL
        CALL KEYWR(KOV,KEYS,CHAR,3)
      WRITE(6,*) 'BEI 3_STEP RECUR(0) OD. VON NULL AUS (1):'
        READ(5,*) JAVON0
        KEYS = 'M3S_JAVON0'
        WRITE(CHAR,6021) JAVON0
        CALL KEYWR(KOV,KEYS,CHAR,3)

C     ENDIF   ! 3_STEP

WRITE(6,*) 'PENALTY MAL 1000 (Z.B. 200):'
        READ(5,*) IPENALTY
        KEYS = 'M3S_IPENALTY'
        WRITE(CHAR,6021) IPENALTY
        CALL KEYWR(KOV,KEYS,CHAR,3)
        PENALTY = IPENALTY/1000.
      WRITE(6,*) 'JADEBUG (0/1:'
        READ(5,*) JADEBUG
```

```
      CALL SM3S (KIN,KOV,KOM, NSE,NZE,NBILD, NBOU,
     +            LGRIDS,LGRIDZ,MAXUS,MAXUZ,IFINE,ITH1, JAMCOUT,
     +            KIM,NSM,NZM, JAMASK,PENALTY, MIPO,
     +            JADEBUG,IFIZAE1,IFINEN1,MAXUFOL,JAVON0)

STOP
      END

C*****************************************************************
C
      SUBROUTINE SM3S (KIN,KOV,KOM, NSE,NZE,NBILD, NBOU,
     +            LGRIDS,LGRIDZ,MAXUS,MAXUZ,IFINE,ITH1, JAMCOUT,
     +            KIM,NSM,NZM, JAMASK,PENALTY, MIPO,
     +            JADEBUG,IFIZAE1,IFINEN1,MAXUFOL,JAVON0)
C
C  V.BRANDT      09.02.87
C  LAST UPDATE   24.03.87
C
C  FULL SEARCH BEWEGUNGSSCHAETZUNG AUF 1/2 PIXEL GENAU, BZW. DURCH
C  IFINE GESTEUERT.
C
C  24.03.87:  AUCH FUER INTERPOLATION (MIPO).
C
C  UEBERGABEPARAMETER (ALLES   I N P U T):
C  KIN                   EINGABEKANALNUMMER
C  KOV                   AUSGABEKANALNUMMER FUER VEKTOREN.
C  KOM                   BEWEGUNGSKOMPENSIERTES BILD.
C  NSE                   ANZAHL SPALTEN
C  NZE                   ANZAHL ZEILEN
C  NBILD                 ANZAHL BILDER
C  LGRIDS                VEKTORENDICHTE HORI.
C  LGRIDZ                VEKTORENDICHTE VERT.
C  MAXUS                 SUCHBEREICH HORI.
   MAXUZ                 SUCHBEREICH VERT.
C  IFINE                 GENAUIGKEIT DER VEKTOREN.
C  ITH1                  SCHWELLE
C  JAMCOUT               0/1: BEWEGUNGSKOMPENSIERTES BILD AUSGEBEN?
C  KIM                   KANALNUMMER FUER MASKE IN.
C  NSM,NZM               GROESSE DER MASKE.
C  MIPO                  INTERPOLATIONSFAKTOR (Z.B. 3 FUER SIMP62.03I)
C  NBOU                  ANZAHL OUTPUT-BILDER (=NBILD*MIPO)
C
C*****************************************************************

PARAMETER NSX = 512              ! MAX(NSE) FUER DIMENSIONIERUNG.
      PARAMETER NZX = 512              ! MAX(NZE)

CHARACTER KEYS*20
      INTEGER*2 KB0(NSX,NZX)
      INTEGER*2 KB1(NSX,NZX)
      INTEGER*2 KB0MC(NSX,NZX)         ! BEWEGUNGSKOMPENSIERT.
      INTEGER*2 KB1MC(NSX,NZX)         ! KB1, BEWEGUNGSKOMPENSIERT.
      INTEGER*2 MVSZ(NSX,NZX*2)        ! VEKTORFELD.
      INTEGER*2 MASKE(NSX,NZX)         ! MASKE, KLEIN.
      INTEGER*2 MASK(NSX,NZX)          ! C/U-MASKE IN BILDGROESSE.

6000  FORMAT(10X,' BILD NR'I3,A30)

IF (NSE.GT.NSX.OR.NZE.GT.NZX) STOP 'BILD ZU GROSS.'

C  AKTUELLE GROESSE DER VEKTORFELDER:

NSV = NSE/LGRIDS
      NZV = NZE/LGRIDZ
      NZV2 = NZV*2                     ! ANZAHL ZEILEN FUER S UND Z-KOMPONENTEN.
      IF (JAMASK.EQ.1) THEN
         LBLMAS = NSE/NSM              ! BLOCKSIZE DER MASKE
         LBLMAZ = NZE/NZM              ! BLOCKSIZE DER MASKE
      ENDIF
```

```
C KB1, DAS NEUE BILD, U.A., VORBELEGEN:

CALL SETCI2 (NSX,NSE,NZE,128, KB1)
      CALL SETCI2 (NSX,NSE,NZE,128, KB0MC)
      CALL SETCI2 (NSX,NSV,NZV2,128, MVSZ)     ! VEKTORFELDER.

C FUER ALLE INPUTBILDER:

DO IPIC = 1,NBILD
         IUV = 1                 ! NUR LUMINANZ.

C COPY KB1 TO KB0:

CALL COPYI2 (NSX,NSE,NZE,KB1, KB0)

C BILD DER SEQUENZ EINLESEN:

WRITE(6,6000) IPIC,'EINLESEN...'
         CALL PICREAD (KIN,NSX, KB1, IPIC,IUV)

C GGF. MASKE EINLESEN UND VERGROESSERN:

IF (JAMASK.EQ.1) THEN
            WRITE(6,6000) IPIC,'C/U-MASKE EINLESEN...'
            CALL PICREAD (KIM,NSX, MASKE, IPIC,1)
            CALL IPOBL (NSX,NSM,NZM, MASKE, NSX,MASK,
     +         LBLMAS,LBLMAZ)
         ENDIF

C FUER ALLE ERGEBNISBILDER:

DO MIPCOU = 1,MIPO
            IPICOU = (IPIC-1)*MIPO+MIPCOU
            W0 = FLOAT(MIPCOU)/MIPO

C BEWEGUNGSSCHAETZUNG:

IF (IPIC.GT.1) THEN
               IF (MIPO.EQ.1 .OR. MIPCOU.LT.MIPO) THEN
                  WRITE(6,6000) IPICOU,'THREE STEP...'
                  CALL M63S3 (NSX,NSE,NZE, NSX,LGRIDS,LGRIDZ, KB0,KB1,
     +               MAXUS,MAXUZ, ITH1,IFINE,
     +               JADEBUG,IFIZAE1,IFINEN1,MAXUFOL,
     +               JAVON0, MIPO,MIPCOU,KB1MC,
     +               MASK,JAMASK,PENALTY,
     +               MVSZ(1,1),MVSZ(1,NZV+1), KB0MC)
               ELSE    ! IPO AN DEN STUETZSTELLEN; NUR COPY:
                  CALL SETCI2 (NSX,NSV,NZV2,128, MVSZ)    ! VEKTORFELDER.
                  CALL COPYI2 (NSX,NSE,NZE,KB1, KB0MC)    ! KB1 SELBST.
               ENDIF
            ELSE          ! IPIC.EQ.1:
               IF (MIPO.GT.1) THEN       ! LANGSAMES UEBERBLENDEN:
                  DO IZ = 1,NZE
                     CALL LIKO2 (NSE,KB0(1,IZ),KB1(1,IZ),1.-W0,W0,0.,
     +                  KB0MC(1,IZ))
                  ENDDO
               ENDIF
            ENDIF      ! IPIC

C VEKTORFELDER AUSGEBEN:

WRITE(6,6000) IPICOU,'VEKTOREN ALS LUM AUSGEBEN...'
            CALL PICWRITE (KOV,NSX, MVSZ, IPICOU,IUV,1)
```

```
C  MOT-COMP. BILD AUSGEBEN:

IF (JAMCOUT.EQ.1) THEN
              WRITE(6,6000) IPICOU,'BILD AUSGEBEN...'
              CALL PICWRITE (KOM,NSX, KB0MC, IPICOU,IUV,1)
            ENDIF

ENDDO ! MIPCOU, IPICOU

ENDDO   ! IPIC

CALL BELLV1 (1)            ! BELLT 1*.

RETURN
       END

C*****************************************************************
C
       SUBROUTINE M63S3 (NSX,NSE,NZE, NSVX,LGRIDS,LGRIDZ, KB0,KB1,
     +          MAXUS,MAXUZ, ITH1,IFINE, JADEBUG,IFIZAE1,IFINEN1,MAXUFOL,
     +          JAVON0, MIPO, MIPCOU,KB1MC,
     +          MASK,JAMASK,PENALTY,
     +          MVS,MVZ, KB0MC)
C
C  V.BRANDT     09.02.87
C  LAST UPDATE    "
C
C  3S-MOTION ESTIM WITH SUBPEL ACCURACY.
C
C  I N P U T :
C  NSX,NSE,NZE                  BILDFORMAT.
C  NSVX                         MAX. SPALTENZAHL VEKTORFELD.
C  LGRIDS,LGRIDZ                BLOCKSIZE HOR, VERT.
C  KB0(NSX,NZE)                 ALTES BILD
C  KB1(NSX,NZE)                 NEUES BILD
C  MAXUS,MAXUZ                  SUCHBEREICH.
C  ITH1                         OBERGRENZE EINZELPIXELDIFFERENZEN.
C  IFINE                        ENDGUELTIGE FEINHEIT DER VEKTOREN (NENNER)
C  IFIZAE1                      ANFANGS-FEINHEIT (ZAEHLER)
C  IFINEN1                      ANFANGS-FEINHEIT (NENNER)
C                               (FEINHEIT = IFIZAE/IFINEN)
C  MIPO                         WENN =1, PREDICTION.
C  MIPCOU                       IPO-ZAEHLER
C
C  O U T P U T :
C  MVS(NSVX,NZE/LGRIDZ)         VEKTORFELD, HORI. KOMPONENTE
C  MVZ(NSVX,NZE/LGRIDZ)         VEKTORFELD, VERT. KOMPONENTE
C  KB0MC(NSX,NZE)               MOTION COMPENSATED KB0.
C  KB1MC(NSX,NZE)             "  KB1  (FUER IPO, ZWISCHENSPEICHER).
C
C*****************************************************************

INTEGER*2 KB0(NSX,NZE)
       INTEGER*2 KB1(NSX,NZE)
       INTEGER*2 KB0MC(NSX,NZE)
       INTEGER*2 KB1MC(NSX,NZE)
       INTEGER*2 MASK(NSX,NZE)
       INTEGER*2 MVS(NSVX,*)
       INTEGER*2 MVZ(NSVX,*)

INTEGER*2 LOOPS(4),IFINENF(5),IFIZAEF(5),LOOP1(4,4)
       DATA LOOPS   /3,4,5,5/           ! MAXIMAL 5 LOOPS.
       DATA IFINENF /1,1,1,2,4/         ! IFINEN = F(LOOP)
       DATA IFIZAEF /4,2,1,1,1/         ! SCHRITTGROESSE
       DATA LOOP1 /
     +   3,2,0,1,          ! FUER IFIZAE1 = 1,2,3,4, IFINEN1 = 1
     +   4,0,0,0,          ! FUER IFIZAE1 = 1,2,3,4, IFINEN1 = 2
     +   4*0,              ! FUER                    IFINEN1 = 3 (INVALID)
     +   5,0,0,0/          ! FUER IFIZAE1 = 1,       IFINEN1 = 4
```

```
C  ANZAHL LOOPS BESTIMMEN:

WRITE(6,6991) IFINE,IFIZAE1,IFINEN1
6991    FORMAT (' M63S3: IFINE,IFIZAE1,IFINEN1:'3I4)

IF (IFINE.LE.0.OR.IFINE.GT.4) STOP '@#$M63S2: IFINE!'
        LOOPEND = LOOPS(IFINE)
        LOOPSTART = LOOP1 (IFIZAE1,IFINEN1)
        IF (LOOPSTART.EQ.0) STOP '@#$M63S2: IFIZAE1,IFINEN1 INVALID.'

C  AKTUELLE GROESSE DER VEKTORFELDER:

NSV = NSE/LGRIDS
        NZV = NZE/LGRIDZ

C  FUER ALLE VEKTOREN IN DIESEM FELD:

DO IZV = 1,NZV
          IZ1 = (IZV-1)*LGRIDZ+1
          IF (MOD(IZ1,64).EQ.1) WRITE(6,'(1H+,I3)') IZ1
        DO ISV = 1,NSV
          IS1 = (ISV-1)*LGRIDS+1

IF (JADEBUG.EQ.1.AND.IZV.EQ.ISV) THEN
           WRITE(6,6888) IS1,IZ1,LOOPSTART,LOOPEND
6888       FORMAT (/' M63S2:IS1,IZ1'2I4,' LOOPSTART/END:'2I4)
           JADEBU2 = 1
        ELSE
           JADEBU2 = 0
        ENDIF

C  FUER DIE VEKTORSCHRITTWEITEN 4,2,1, 1/2, 1/4:

IVOPTS = 0
        IVOPTZ = 0
        DMIN = 1.E20
        DO LOOP = LOOPSTART,LOOPEND
          IFIZAE = IFIZAEF(LOOP)                    ! SCHRITTWEITE.
          IFINEN = IFINENF(LOOP)
          IF (IFINEN.GT.1) THEN
             IVOPTS = IVOPTS*2
             IVOPTZ = IVOPTZ*2
          ENDIF

C  STARTPUNKT BESTIMMEN:

IF (JAVON0.EQ.0) THEN
             IV0S = IVOPTS
             IV0Z = IVOPTZ
          ELSEIF (JAVON0.EQ.1) THEN
             IV0S = 0
             IV0Z = 0
          ENDIF         ! JAVON0

C. GROESSE SUCHGEBIET:

MAXU = MAXUS
          IF (LOOP.GT.LOOPSTART) MAXU = MAXUFOL*IFIZAE
          IVDXS = MAXU/IFIZAE*IFIZAE     !       SUCHBEREICH
          MAXU = MAXUZ
          IF (LOOP.GT.LOOPSTART) MAXU = MAXUFOL*IFIZAE
          IVDXZ = MAXU/IFIZAE*IFIZAE     !       SUCHBEREICH

IF (JADEBUG.EQ.1.AND.IZV.EQ.ISV) THEN
             WRITE(6,6886) IS1,IZ1,LOOP,IVDXS,IVDXZ,IFIZAE,IFINEN
6886         FORMAT (/' M63S2:IS1,IZ1'2I4' LOOP'I2' SPACE'2I2
        +              ' IFIZAE/NEN'2I2)
          ENDIF
```

```
            CALL FSBLMI (NSX,NSE,NZE, KB0,KB1, IS1,IZ1, LGRIDS,LGRIDZ,
     +     IFINEN, IV0S,IV0Z, IFIZAE,IFIZAE, IVDXS,IVDXZ,ITH1, JADEBU2,
     +        MASK, JAMASK, PENALTY,
     +         MIPO,MIPCOU,KB1MC,
     +      IVOPTPS,IVOPTPZ,DMINP, KB0MC)

C   IVOPTPS/Z (PRELIMINARY) UEBERNEHMEN, WEIL BESSER?

IF (DMINP.LT.DMIN) THEN
              DMIN = DMINP
              IVOPTS = IVOPTPS
              IVOPTZ = IVOPTPZ
            ENDIF

IF (JADEBUG.EQ.1.AND.IZV.EQ.ISV) THEN
              WRITE(6,6887) IS1,IZ1,IFIZAE,IFINEN,IVOPTS,IVOPTZ,DMIN
6887          FORMAT (/' M63S2:IS1,IZ1'2I4' IFIZAE/NEN'2I2' OPT:'2I3,F6.0)
            ENDIF

ENDDO    ! LOOP

MVS(ISV,IZV) = NINT (128+4./IFINEN*IVOPTS)
          MVZ(ISV,IZV) = NINT (128+4./IFINEN*IVOPTZ)

ENDDO    ! ISV
      ENDDO    ! IZV

RETURN
      END

C**********************************************************************
C
      SUBROUTINE FSBLMI (NSX,NSE,NZE, KB0,KB1, IS1,IZ1, LBLS,LBLZ,
     +     IQUANT, IV0S,IV0Z, IVDS,IVDZ, IVDXS,IVDXZ,ITH1, JADEBU2,
     +        MASK, JAMASK, PENALTY,
     +         MIPO,MIPCOU,KB1MC,
     +      IVOPTS,IVOPTZ,DMIN, KB0MC)

C
C  V.BRANDT      11.02.87
C  LAST UPDATE   18.03.87
C
C  FULL SEARCH FUER 1 BLOCK (KONSTANTE VERSCHIEBUNG); BISHERIGER
C  OPTIMALER VEKTOR VORGEBBAR.
C  13.02.87:  MIT CHANGED/UNCHANGED-MASKE.
C
C  I N P U T :
C  NSX,NSE,NZE          BILDFORMAT
C  KB0(NSX,NZE)         ALTES BILD
C  KB1(NSX,NZE)         NEUES BILD
C  IS1,IZ1              LI. OBERE BLOCKECKE.
C  LBLS,LBLZ            BLOCKSIZE
C  IQUANT               QUANTISIERUNG (NENNER) FUER ALLE FOLGENDEN ANGABEN
C                          UEBER DIE VEKTOREN:
C  IV0S,IV0Z            GEGEBENER VEKTOR (ZENTRUM DES SUCHBEREICHS)
C  IVDS,IVDZ            ABSTAND DER SUCHPUNKTE VONEINANDER.
C  IVDXS,IVDXZ          AUSDEHNUNG DES SUCHBEREICHS UM IV0S,IV0Z HERUM.
C
C  MASK(NSX,NZE)        CHANGED/UNCHANGED-MASKE, SO GROSS WIE DAS BILD.
C  JAMASK               0/1: MASKE VERWENDEN?
C  PENALTY              STRAFE PRO PIXEL UND PRO VEKTORLAENGENEINHEIT.
C  MIPO                 FUER INTERPOLATIONS-VEKTOREN.
C  MIPCOU               ZAEHLER
C
C  O U T P U T :
C  IVOPTS,IVOPTZ        SICH ERGEBENDER OPTIMALER VEKTOR (BEACHTE DEN
C                          NENNER IQUANT. IVOPTS=4, IQUANT=2 HEISST
C                          OPTIMALE VERSCHIEBUNG IST 4/2 = 2.)
```

```
C   KB0MC(NSX,NZE)          BEWEGUNSKOMPENSIERTES BILD KB0.
C   KB1MC(NSX,NZE)          "   KB1.
C
C*****************************************************************
      INTEGER*2 KB0(NSX,NZE)
      INTEGER*2 KB1(NSX,NZE)
      INTEGER*2 KB0MC(NSX,NZE)
      INTEGER*2 KB1MC(NSX,NZE)
      INTEGER*2 MASK(NSX,NZE)
      LOGICAL CHANGED

IF (MIPO.GT.1) THEN
         W0 = FLOAT(MIPCOU)/MIPO        ! WIE STARK BILD 0 VERSCHIEBEN
         ! Z.B. MIPO=3, MIPCOU=1: W0 = 1/3
         ! DIE GEWICHTE BEI DER IPO MUESSEN GENAU UMGEKEHRT SEIN. 24.03.87
      ENDIF

C PRUEFE MASKE: GANZER BLOCK UNBEWEGT?:

IF (JAMASK.EQ.1) THEN
         IF (MIPO.GT.1) STOP 'STOP FSBLMI: MIPO & MASKE GIBTS NICHT.'
         CHANGED = .FALSE.
         DO IZ = IZ1,IZ1-1+LBLZ
         DO IS = IS1,IS1-1+LBLS
            IF (MASK(IS,IZ).GT.0) THEN
               CHANGED = .TRUE.
            ENDIF
         ENDDO
         ENDDO
      ELSE
         CHANGED = .TRUE.
      ENDIF

IF (JADEBU2.EQ.1) THEN
         WRITE(6,6887) IS1,IZ1,CHANGED
6887     FORMAT(' MASKE BEI'2I4' CHANGED='L2)
         DO IZ = IZ1,IZ1-1+LBLZ
            WRITE(6,6886) (MAX(0,MIN(1,MASK(IS,IZ))),IS=IS1,IS1-1+LBLS)
         ENDDO
6886     FORMAT(X,32I2)
      ENDIF

C PENALTY PRO VEKTORLAENGENEINHEIT:

PENALT = PENALTY*LBLS*LBLZ

C BEWEGUNGSSCHAETZUNG WENN CHANGED:

IF (.NOT.CHANGED) THEN
         DMIN = -1.                  ! ALS ZEICHEN FUER MASKENANWENDUNG
         IVOPTS = 0
         IVOPTZ = 0
      ELSE      !       SUCHE NACH OPTIMUM:
         DMIN = 1.E20                ! IST GROSS GENUG.
         DO IDZ = IV0Z-IVDXZ, IV0Z+IVDXZ, IVDZ
         DO IDS = IV0S-IVDXS, IV0S+IVDXS, IVDS

C HOLE BLOCK, MIT VERSCHIEBUNG:

IF (MIPO.EQ.1) THEN   ! KEINE INTERPOLATION:
               IF (IQUANT.GT.1) THEN
                  ADZ = FLOAT(IDZ)/IQUANT
                  ADS = FLOAT(IDS)/IQUANT
                  CALL GETBLAM (NSX,NSE,NZE, KB0, IS1,IZ1,LBLS,LBLZ,ADS,ADZ,
     +                          JAMASK,MASK,
     +                          KB0MC)
```

```
              ELSE
                CALL GETBLIM (NSX,NSE,NZE, KB0, IS1,IZ1,LBLS,LBLZ,IDS,IDZ,
     +            JAMASK,MASK,
     +            KB0MC)
              ENDIF      ! IQUANT
            ELSEIF (MIPO.GT.1) THEN
              ADZ = FLOAT(IDZ)/IQUANT
              ADS = FLOAT(IDS)/IQUANT
              CALL GETBLAI (NSX,NSE,NZE, KB0,KB1,
     +          IS1,IZ1,LBLS,LBLZ,ADS,ADZ, W0,
     +          KB0MC,KB1MC)
            ELSE
              STOP 'STOP FSBLMI: MIPO, IQUANT INVALID !'
            ENDIF

C   BERECHNE DIFFERENZ:

IF (MIPO.EQ.1) THEN
              CALL M5DIFBL (NSX,NSE,NZE, KB0MC,KB1,
     +          IS1,IZ1, LBLS,LBLZ, ITH1,
     +          IDIFABS)
            ELSE         ! MIPO.GT.1:
              CALL M5DIFBL (NSX,NSE,NZE, KB0MC,KB1MC,
     +          IS1,IZ1, LBLS,LBLZ, ITH1,
     +          IDIFABS)
            ENDIF

C   PENALTY DRAUF:

DVEC = PENALT * (ABS(IDZ)+ABS(IDS))/ IQUANT
            DIST = DVEC + IDIFABS

C   MINIMUM?

IF (DIST.LT.DMIN) THEN
              DMIN = DIST
              IVOPTS = IDS
              IVOPTZ = IDZ
            ENDIF

IF (JADEBU2.EQ.1) THEN
              WRITE(6,6999) IDS,IDZ, DVEC,DIST,DMIN,IVOPTS,IVOPTZ
6999          FORMAT (' FSBL: IDS,IDZ'2I3' DVEC,DIST,DMIN'3F7.0,
     +          ' IVOPTS/Z'2I3)
            ENDIF

ENDDO           ! IDS
          ENDDO           ! IDZ
        ENDIF    ! CHANGED.

C   FESTHALTEN UND MOTCOMPENSATION:

IF (MIPO.EQ.1) THEN       ! KEINE INTERPOLATION
          IF (IQUANT.GT.1) THEN
            ADZ = FLOAT(IVOPTZ)/IQUANT
            ADS = FLOAT(IVOPTS)/IQUANT
            CALL GETBLAM (NSX,NSE,NZE, KB0, IS1,IZ1,LBLS,LBLZ,ADS,ADZ,
     +        JAMASK,MASK,
     +        KB0MC)
          ELSE
            CALL GETBLIM (NSX,NSE,NZE, KB0, IS1,IZ1,LBLS,LBLZ,
     +        IVOPTS,IVOPTZ,
     +        JAMASK,MASK,
     +        KB0MC)
          ENDIF
        ELSE      ! MIPO.GT.1
          ADZ = FLOAT(IVOPTZ)/IQUANT
          ADS = FLOAT(IVOPTS)/IQUANT
```

```
      CALL GETBLAI (NSX,NSE,NZE, KB0,KB1,
     +       IS1,IZ1,LBLS,LBLZ,ADS,ADZ, W0,
     +       KB0MC,KB1MC)
      DO IZ = IZ1,IZ1-1+LBLZ
      DO IS = IS1,IS1-1+LBLS
        KB0MC(IS,IZ) = NINT ((1.-W0)*KB0MC(IS,IZ)+W0*KB1MC(IS,IZ))
      ENDDO
      ENDDO
    ENDIF

RETURN
    END
```

```
C*******************************************************************
C
      PROGRAM M6ITER2       ! ERST VEKTOREN, DANN BILD EINLESEN (F.I*2)
C
C  V.BRANDT     17.02.87
C  LAST UPDATE  22.05.87
C
C  ITERATION USING SUBR M6DVEC.
C  20.01.87:    AUCH MIT MIPO (INTERPOLATION). UND LOGICAL CHEF(CHANGED)
C  22.05.87:    ALLE DIST-WERTE AUSGEBEN, FALLS GEWUENSCHT. (JAITAUS)
C
C  MAN MUSS DAS PROGRAMM LINKEN MIT DEN BIBLIOTHEKEN
C     DRB2:[BR.P]LIB1/LIB, DRA0:[PUBLIC]INFO/LIB
C
C*******************************************************************

CHARACTER  KEYS*20, CHAR*60, NAME50*50, PROGRAM*30, NAMVEC*50
        DATA PROGRAM /'M6ITER2'/

6001    FORMAT(X,I8,2X,A40)
6021    FORMAT(I8)
6023    FORMAT(A30)
6024    FORMAT(F8.3)
  00    FORMAT(A50)

KIN = 11                ! BILDSIGNAL.
        KIV = 13                ! GEGEBENES VEKTORFELD.

KOM = 16                ! VERSCHOBENES ERGEBNISBILD
        KOV = 15                ! VERBESSERTES VEKTORFELD.
        KIT = 17                ! DATEI WO DIST(ITER) AUSGEGEBEN WIRD.

C  OEFFNEN EINGABEDATEI:

WRITE(6,*) ' --> GEGEBENE VEKTORBILDFOLGE:'
        CALL PICOLD (KIV, NSV,NZV2,NBILDV,NUV,IPICV1, NAMVEC)
        NZV = NZV2/2      ! NEU: NBILDV = MIPO*NBILD !

WRITE(6,*) 'BILDFOLGE:'
        CALL PICOLD (KIN, NSE,NZE,NBILD,NUV,IPIC1, NAME50)
        IF (NUV.NE.1) THEN
          STOP 'MIT_1: FARBE NICHT SUPPORTED !!!'
        ENDIF

LGRIDS = NSE/NSV
        LGRIDZ = NZE/NZV
        IF (LGRIDS.NE.LGRIDZ) STOP 'LGRIDS.NE.LGRIDZ'
        LBLO = LGRIDS

WRITE(6,6888) NSE,NZE,NSV,NZV,LBLO
6888    FORMAT (' KONTROLLE: NSE,NZE,NSV,NZV,LBLO:'5I4)

WRITE(6,*) ' BLOCKSIZE HALBIEREN? (JASUB) (0/1):'
        READ(5,*) JASUB
        NSW = NSV
```

```
        NZW = NZV
        IF (JASUB.EQ.1) THEN
          NSW = NSV*2
          NZW = NZV*2
        ENDIF
        NZW2 = NZW*2

WRITE(6,*) 'BEWEGUNGSKOMPENSIERTES BILD AUSGEBEN (0/1)?:'
        READ(5,*) JAMCOUT

C    AUSGABEDATEI:

WRITE(6,*) '--> NEUE VEKTOREN ALS KLEINES LUMINANZBILD:'
        CALL PICNEW (KOV, NSW, NZW2, NBILDV,NUV)
        IF (JAMCOUT.EQ.1) THEN
          WRITE(6,*) '--> BEWEGUNGSKOMPENSIERTES ERGEBNISBILD:'
          CALL PICNEW (KOM, NSE,NZE,NBILDV,NUV)
        ENDIF

C    PARAMETER:

KEYS = 'M6I_1_PROGRAM'
        WRITE(CHAR,6023) PROGRAM
        CALL KEYWR(KOV,KEYS,CHAR,3)
        KEYS = 'M6I_1_QUELLE'
        WRITE(CHAR,5000) NAME50
        CALL KEYWR(KOV,KEYS,CHAR,3)
        KEYS = 'M6I_1_ALTE_VEKTOREN'
        WRITE(CHAR,5000) NAMVEC
        CALL KEYWR(KOV,KEYS,CHAR,3)
        KEYS = 'M6I_1_IPIC1'                    ! NUMMER ERSTES BILD
        WRITE(CHAR,6021) IPIC1
        CALL KEYWR(KOV,KEYS,CHAR,3)

KEYS = 'M6I_LBLO'                       ! HORI. VEKTORENRASTER
        WRITE(CHAR,6021) LGRIDS
        CALL KEYWR(KOV,KEYS,CHAR,3)
        KEYS = 'M6I_JASUB'
        WRITE(CHAR,6021) JASUB
        CALL KEYWR(KOV,KEYS,CHAR,3)
          LBLONEU = LBLO
          IF (JASUB.EQ.1) LBLONEU = LBLO/2

WRITE(6,*) 'OBERGRENZE ITH1 FUER PIXEL:'
        READ(5,*) ITH1
        KEYS = 'M6I_ITH1'
        WRITE(CHAR,6021) ITH1
        CALL KEYWR(KOV,KEYS,CHAR,3)
        WRITE(6,*) 'PENALTY MAL 1000 (Z.B. 200):'
        READ(5,*) IPENALTY
        KEYS = 'M6I_IPENALTY'
        WRITE(CHAR,6021) IPENALTY
        CALL KEYWR(KOV,KEYS,CHAR,3)
        PENALTY = IPENALTY/1000.
        WRITE(6,*) 'MAX. ITERATIONEN:'
        READ(5,*) ITERX
        KEYS = 'M6I_ITERX'
        WRITE(CHAR,6021) ITERX
        CALL KEYWR(KOV,KEYS,CHAR,3)

WRITE(6,*) 'INTERPOLATIONSFAKTOR MIPO:'           ! NEU
        READ(5,*) MIPO
        KEYS = 'M6I_MIPO'
        WRITE(CHAR,6021) MIPO
        CALL KEYWR(KOV,KEYS,CHAR,3)
        IF (NBILD*MIPO .NE. NBILDV) THEN
          WRITE (6,6999) NBILD,MIPO,NBILDV
6999      FORMAT (' NBILD*MIPO.NE.NBILDV ! :',3I5)
```

```
C         IF (MIPO.GT.1) THEN
C            WRITE(6,*) 'INTERPOLATIONSZAEHLER MIPCOU:'        ! NEU
C            READ(5,*) MIPCOU
C            KEYS = 'M6I MIPCOU'
C            WRITE(CHAR,6021) MIPCOU
C            CALL KEYWR(KOV,KEYS,CHAR,3)
C         ENDIF    ! MIPO.GT.1

WRITE(6,*) 'FUER JEDE ITER DIST AUSGEBEN (0/1)?'
          READ(5,*) JAITAUS
          KEYS = 'M6I JAITAUS'
          WRITE(CHAR,6021) JAITAUS
          CALL KEYWR(KOV,KEYS,CHAR,3)
          IF (JAITAUS.EQ.1) THEN
          WRITE(6,*) 'NAME FUER AUSGABE DER DIST-WERTE:'
            READ(5,'(A50)') NAME50
            KEYS = 'M6I JAIT_NAME'
            WRITE(CHAR,5000) NAME50
            CALL KEYWR(KOV,KEYS,CHAR,3)
            OPEN (KIT,NAME=NAME50, STATUS='NEW')
          ENDIF

WRITE(6,*) 'JADEBUG (0/1):'
            READ(5,*) JADEBUG

CALL SM6I (KIN,KIV,KOV,KOM, NSE,NZE,NBILD,
     +              LBLO,LBLONEU, ITH1, JAMCOUT,JASUB,
     +              NSV,NZV,NZV2, NSW,NZW,NZW2, PENALTY,ITERX,
     +              MIPO, NBILDV, JAITAUS,KIT,
     +              JADEBUG)

STOP
          END

C*****************************************************************
C
          SUBROUTINE SM6I (KIN,KIV,KOV,KOM, NSE,NZE,NBILD,
     +              LBLO,LBLONEU, ITH1, JAMCOUT,JASUB,
     +              NSV,NZV,NZV2, NSW,NZW,NZW2, PENALTY,ITERX,
     +              MIPO, NBILDV, JAITAUS,KIT,
     +              JADEBUG)
C
C V.BRANDT      09.02.87
C LAST UPDATE   22.05.87
C
C ITERATIONEN. MIT EINFACHEM SMOOTHING CRITERIUM GEGEN AUSREISSER.
C 30.03.87:  FUER INTERPOLATION (NUN RICHTIG, OHNE FESTES MIPCOU).
C    INPUT-BILDSEQUENZ MIT NBILD,
C    INPUT-VEKTOREN   MIT NBILDV = MIPO*NBILD
C    OUTPUT-BILD+VEK  MIT NBILDV.
C 22.05.87: JAITAUS
C
C UEBERGABEPARAMETER (ALLES  I N P U T):
C KIN                  EINGABEKANALNUMMER
C KOV                  AUSGABEKANALNUMMER FUER VEKTOREN.
C KOM                  BEWEGUNGSKOMPENSIERTES BILD.
C NSE                  ANZAHL SPALTEN
C NZE                  ANZAHL ZEILEN
C NBILD                ANZAHL BILDER
C ITH1                 SCHWELLE
C JAMCOUT              0/1: BEWEGUNGSKOMPENSIERTES BILD AUSGEBEN?
C KIM                  KANALNUMMER FUER MASKE IN.
C NSM,NZM              GROESSE DER MASKE.
C MIPO                 INTERPOLATIONSFAKTOR (Z.B. 3 FUER SIMP62.031)
C NBILDV               = NBILD*MIPO
C JAITAUS              0/1: DIST BEI JEDER ITERATION AUSGEBEN?
```

```
C
C   ETC.
C
C***************************************************************
        PARAMETER NSX = 720              ! MAX(NSE) FUER DIMENSIONIERUNG.
        PARAMETER NZX = 576              ! MAX(NZE)
        PARAMETER NSVX = NSX/4
        PARAMETER NSWX = NSVX            ! SOLLTE UNBEDINGT NSVX=NSWX SEIN !
        PARAMETER NZVX = NZX/4           ! FUER VEKTORFELDER.
        PARAMETER NZWX = NZVX

CHARACTER KEYS*20
        INTEGER*2 KB0(NSX,NZX)
        INTEGER*2 KB1(NSX,NZX)
        INTEGER*2 KB0MC(NSX,NZX)         ! BEWEGUNGSKOMPENSIERT.
        INTEGER*2 MVSZ(NSVX,NZVX*2)      ! VEKTORFELD.
        INTEGER*2 MWSZ(NSWX,NZWX*2)      ! NEUES VEKTORFELD.
        INTEGER*2 KB1MC(NSX,NZX)         ! NEU, FUER MIPO.
        LOGICAL   CHEF (0:1,NSWX,NZWX)   ! CHANGED, FUER JEDEN VEKTOR.
        REAL      DISTF(2,NSWX,NZWX)     ! DISTANCE, FOR ALL VECTORS.

6000    FORMAT(10X,' BILD NR'I3,A30)

IF (NSE.GT.NSX.OR.NZE.GT.NZX) STOP 'BILD ZU GROSS.'
        LBLONEU = LBLO
        IF (JASUB.EQ.1) LBLONEU = LBLO/2
        WRITE(6,6098) LBLO,LBLONEU
6098    FORMAT (' SM6I: LBLO,LBLONEU:'2I4)
        NSV = NSE/LBLO
        NZV = NZE/LBLO
        NSW = NSE/LBLONEU
        NZW = NZE/LBLONEU
        IF (NSV.GT.NSVX.OR.NZV.GT.NZVX) STOP 'VEKTORFELD V ZU GROSS.'
        IF (NSW.GT.NSWX.OR.NZW.GT.NZWX) STOP 'VEKTORFELD W ZU GROSS.'

C KB1, DAS NEUE BILD, U.A., VORBELEGEN:

CALL SETCI2 (NSX,NSE,NZE,128, KB1)
        CALL SETCI2 (NSX,NSE,NZE,128, KB0MC)

C FUER ALLE BILDER:

DO IPIC = 1,NBILD
          IUV = 1                        ! NUR LUMINANZ.

C COPY KB1 TO KB0:

CALL COPYI2 (NSX,NSE,NZE,KB1, KB0)

C BILD DER SEQUENZ EINLESEN:

WRITE(6,6000) IPIC,'BILD EINLESEN...'
          CALL PICREAD (KIN,NSX, KB1, IPIC,IUV)

C FUER ALLE ERGEBNISBILDER:

DO MIPCOU = 1,MIPO
            IPICOU = (IPIC-1)*MIPO+MIPCOU
            W0 = FLOAT(MIPCOU)/MIPO

C BISHERIGES VEKTORFELD EINLESEN:

WRITE(6,6000) IPICOU,'VEKTOREN EINLESEN...'
            CALL PICREAD (KIV,NSVX, MVSZ, IPICOU,IUV)
            DO IZV = 1,NZV2
              CALL LIKO2 (NSV,MVSZ(1,IZV),MVSZ(1,IZV),0.25,0.0,-32.,
     +          MVSZ(1,IZV))
            ENDDO
```

```
C   ITERATIVE VERBESSERUNG:

IF (MIPO.EQ.1 .OR. MIPCOU.LT.MIPO) THEN
              WRITE(6,6000) IPICOU,'ITERATIONEN...'
              CALL M6SITER3 (NSX,NSE,NZE, KB0,KB1, NSVX,NSWX, NSV,NZV,
     +          MVSZ(1,1),MVSZ(1,NZV+1), JASUB,LBLO,ITERX,PENALTY,ITH1,
     +          MIPO,MIPCOU,KB1MC, CHEF,DISTF,
     +          JADEBUG, JAITAUS,KIT,
     +          LBLE, NSW,NZW,
     +          MWSZ(1,1),MWSZ(1,NZW+1), KB0MC,DSUM,DLUMSUM)
            ELSE           ! IPO AN DEN STUETZSTELLEN; NUR COPY:
              CALL SETCI2 (NSWX,NSW,NZW2,0, MWSZ)      ! VEKTORFELDER.
              CALL COPYI2 (NSX,NSE,NZE,KB1, KB0MC)     ! KB1 SELBST.
            ENDIF

C   VEKTORFELDER AUSGEBEN:

WRITE(6,6000) IPICOU,'VEKTOREN ALS LUM AUSGEBEN...'
            DO IZW = 1,NZW2
              CALL LIKO2 (NSW,MWSZ(1,IZW),MWSZ(1,IZW),4.0,0.0,128.,
     +          MWSZ(1,IZW))
            ENDDO
            CALL PICWRITE (KOV,NSWX, MWSZ, IPICOU,IUV,1)

C   MOT-COMP. BILD AUSGEBEN:

IF (JAMCOUT.EQ.1) THEN
              WRITE(6,6000) IPICOU,'BILD AUSGEBEN...'
              CALL PICWRITE (KOM,NSX, KB0MC, IPICOU,IUV,1)
            ENDIF

ENDDO ! MIPCOU
        ENDDO   ! IPIC

CALL BELLV1 (1)          ! BELLT 1*.

RETURN
        END

C*****************************************************************
C
        SUBROUTINE M6SITER3 (NSX,NSE,NZE, KB0,KB1, NSVX,NSWX, NSV,NZV,
     +    MSV,MZV, JASUB,LBLO,ITERX,PENALTY,ITH1,
     +        MIPO,MIPCOU,KB1MC, CHEF,DISTF,
     +        JADEBUG, JAITAUS,KIT,
     +    LBLE, NSW,NZW,
     +    MSW,MZW, KB0MC,DSUM,DLUMSUM)
C
C 30.03.87: NUN AUCH FUER INTERPOLATION RICHTIG ...
C
C I N P U T :
C NSX,NSE,NZE
C KB0,KB1
C NSVX,NSV,NZV
C NSWX              FUER ERGEBNISVEKTORBILD
C MSV,MZV           VEKTOREN: 0 = NULL   (NICHT +128 *4)
C JASUB             0/1:  VEKTOREN VERVIERFACHEN
C LBLO              GEGEBENE BLOCKSIZE
C ITERX             MAX. ITER
C PENALTY           GEWICHT FUER UNGLATTHEIT.
C ITH1              MAX DLUM PER PIXEL
C MIPO                      WENN =1, PREDICTION.
C MIPCOU                    IPO-ZAEHLER
C
C I/O:
C CHEF(0:1,NSWX,NZE)   CHANGED, FUER JEDEN VEKTOR.
C
C O U T P U T :
```

```
C  LBLE                    NEUE BLOCKSIZE
C  NSW,NZW
C  MSW,MZW                 NEUES VEKTORFELD
C  KB0MC
C  DSUM                    GESAMTKOSTEN
C  DLUMSUM                 LUM-DIFFERENZEN (DSUM-DLUMSUM=UNGLATTHEIT)
C  KB0MC
C  KB1MC(NSX,NZE)          "   KB1   (FUER IPO, ZWISCHENSPEICHER).
C  DISTF(2,NSWX,NZE)
C
C*****************************************************************

INTEGER*2 KB0  (NSX,NZE)
      INTEGER*2 KB1  (NSX,NZE)
      INTEGER*2 KB0MC (NSX,NZE)
      INTEGER*2 KB1MC (NSX,NZE)

INTEGER*2 MSV (NSVX,NZV)
      INTEGER*2 MZV (NSVX,NZV)
      INTEGER*2 MSW (NSWX,*)  ! (NSWX,NZW)
      INTEGER*2 MZW (NSWX,*)  ! (NSWX,NZW)

LOGICAL CHEF (0:1,NSWX,*)       ! CHANGED, FUER JEDEN VEKTOR
      LOGICAL CHANGED, CHANGEDBL      ! BILD, BLOCK GEAENDERT?
      REAL    DISTF(2,NSWX,*) ! DISTANCE, FOR ALL VECTORS.
      REAL DISTSUMF(0:50)     ! DISTANCE FOR 50 ITERATIONS
      REAL DLUMSUMF(0:50)     ! DISTANCE FOR 50 ITERATIONS
      REAL DVECSUMF(0:50)     ! DISTANCE FOR 50 ITERATIONS

C  FALLS INTERPOLATIONS-VEKTOREN:

IF (MIPO.GT.1) THEN
        W0 = FLOAT(MIPCOU)/MIPO        ! WIE STARK BILD 0 VERSCHIEBEN
        ! Z.B. MIPO=3, MIPCOU=1: W0 = 1/3
      ENDIF

C  BLOECKE VERKLEINERN?:

IF (JASUB.EQ.1) THEN
        LBLE = LBLO/2
        NSW = NSV*2
        NZW = NZV*2
        CALL IPOBL (NSVX,NSV,NZV, MSV, NSWX,  MSW,    2,2)
        CALL IPOBL (NSVX,NSV,NZV, MZV, NSWX,  MZW,    2,2)
      ELSE
        LBLE = LBLO
        NSW = NSV
        NZW = NZV
        CALL COPYI2 (NSVX,NSV,NZV,MSV,MSW)
        CALL COPYI2 (NSVX,NSV,NZV,MZV,MZW)
      ENDIF

C  GEGEBENER WERT DES FUNKTIONALS:

ITER = 0
      DISTSUMF(ITER) = 0
      DLUMSUMF(ITER) = 0
      DVECSUMF(ITER) = 0
C  FUER ALLE BLOECKE:
      DO IZW = 1, NZW
      DO ISW = 1, NSW
C  BLOCKKOORDINATEN:
        IS1 = (ISW-1)*LBLE+1
        IZ1 = (IZW-1)*LBLE+1
        ISDE = MSW(ISW,IZW)
        IZDE = MZW(ISW,IZW)
        IF (MIPO.EQ.1) THEN
            CALL GETBL (NSX,NSE,NZE, KB0, IS1,IZ1,LBLE,LBLE,ISDE,IZDE,
     +         KB0MC)
```

```
              CALL M5DIFBL (NSX,NSE,NZE, KB0MC,KB1,
     +          IS1,IZ1, LBLE,LBLE, ITH1,
     +          IDLUM)
          ELSEIF (MIPO.GT.1) THEN        ! INTERPOLATION:
              IQUANT = 1                 !  HIER NICHT FEINER.
              ADZ = FLOAT(IZDE)/IQUANT
              ADS = FLOAT(ISDE)/IQUANT
              CALL GETBLAI (NSX,NSE,NZE, KB0,KB1,
     +          IS1,IZ1,LBLE,LBLE,ADS,ADZ, W0,
     +          KB0MC,KB1MC)
              CALL M5DIFBL (NSX,NSE,NZE, KB0MC,KB1MC,
     +          IS1,IZ1, LBLE,LBLE, ITH1,
     +          IDLUM)
          ELSE
              STOP 'STOP FSBLMI: MIPO INVALID !'
          ENDIF

C     SMOOTHNESS:
          CALL M6DVEC1 (NSVX,NSW,NZW, LBLE, MSW,MZW,
     +          ISW,IZW, ISW,IZW,  DVEC)
          DVEC = DVEC*PENALTY
C     RESULT:
          DIST = IDLUM + DVEC
          DISTIST = DIST
          DLUMIST = IDLUM
          DVECIST = DVEC
          DISTSUMF(ITER) = DISTSUMF(ITER) + DISTIST
          DLUMSUMF(ITER) = DLUMSUMF(ITER) + DLUMIST
          DVECSUMF(ITER) = DVECSUMF(ITER) + DVECIST
        ENDDO    ! ISW
      ENDDO      ! IZW
      DISTSUMF(ITER) = DISTSUMF(ITER) / (NSE*NZE)
      DLUMSUMF(ITER) = DLUMSUMF(ITER) / (NSE*NZE)
      DVECSUMF(ITER) = DVECSUMF(ITER) / (NSE*NZE)

WRITE(6,6811) LBLE,ITER,
     +      DISTSUMF(ITER),DLUMSUMF(ITER),DVECSUMF(ITER)
6811  FORMAT(' LBLE'I2' ITER'I2' DIST/LUM/VEC PROPEL'3F10.5)
      WRITE(KIT,6811) LBLE,ITER,
     +      DISTSUMF(ITER),DLUMSUMF(ITER),DVECSUMF(ITER)

C     AUFTRAGSBUCH VORBELEGEN:

DO IZW = 1, NZW
      DO ISW = 1, NSW
          CHEF (0,ISW,IZW) = .TRUE.      ! JETZT ALLE PRUEFEN
          CHEF (1,ISW,IZW) = .FALSE.     ! NEXT DURCHLAUF VORERST NICHT.
      ENDDO
      ENDDO

C     ITERATIONEN:

DSUM = 0.
      DLUMSUM = 0.

ITOFRO = 1        ! 0=VORWAERTS, 1=RUECKWAERTS.
      ITER = 0
      CHANGED = .TRUE.
      DO WHILE (CHANGED .AND. ITER.LT.ITERX)
          CHANGED = .FALSE.
          ITOFRO = 1-ITOFRO    ! ALSO BEGINN MIT ITOFRO=0.
          ITER = ITER+1
          NCHECKED = 0         ! ANZAHL GEPRUEFTE BLOECKE
          NCHANGED = 0         ! ANZAHL GEAENDERTE BLOECKE.

IF (JADEBUG.EQ.1) THEN
              DVECSUM = DSUM - DLUMSUM
              WRITE(6,6553) ITER,NCHECKED,NCHANGED,DSUM,DLUMSUM,DVECSUM
```

```
6553        FORMAT (/' ITER'I3',CHECKED'I5',CHANGED'I5
     +            ' DSUM,DLUMSUM,DVEC'3F9.0)
            WRITE(6,*) 'GEGEBENES VEKTORFELD MSW:'
            DO IZW = 1,NZW
               WRITE(6,6868) (MSW(ISW,IZW),ISW=1,MIN(26,NSW))
            ENDDO
            WRITE(6,*) 'GEGEBENES VEKTORFELD MZW:'
            DO IZW = 1,NZW
               WRITE(6,6868) (MZW(ISW,IZW),ISW=1,MIN(26,NSW))
            ENDDO
6868        FORMAT (X,26I3)
         ENDIF

C  FUER ALLE BLOECKE:

DO IZW = 1+ITOFRO*(NZW-1), NZW-ITOFRO*(NZW-1), 1-2*ITOFRO
         DO ISW = 1+ITOFRO*(NSW-1), NSW-ITOFRO*(NSW-1), 1-2*ITOFRO

C  FESTSTELLEN OB PRUEFUNG NOETIG:

IF (CHEF(ITOFRO,ISW,IZW)) THEN
               CHEF(ITOFRO,ISW,IZW) = .FALSE.
               NCHECKED = NCHECKED+1

C  BLOCKKOORDINATEN:

IS1 = (ISW-1)*LBLE+1
               IZ1 = (IZW-1)*LBLE+1

C  SUCHBEREICH BESTIMMEN:

CALL M5VAREA (NSVX,NSW,NZW, MSW,MZW, 1,
     +              ISW,IZW,
     +              ISDMIN,ISDMAX,
     +              IZDMIN,IZDMAX)

C  SUCHEN:

DMIN = 1.E20
               ISDIST = MSW(ISW,IZW)
               IZDIST = MZW(ISW,IZW)
C              IF (JADEBUG.EQ.1) THEN
C                 WRITE(6,6777) IS1,IZ1,ISDIST,IZDIST,DMIN
C6777              FORMAT (' IS1,IZ1,ISDIST,IZDIST,DMIN'2I4,2X,2I3,E10.2)
C                 WRITE(6,6778) ISDMIN,ISDMAX,IZDMIN,IZDMAX
C6778              FORMAT (' ISDMIN/MAX'2I4.'  IZDMIN/MAX'2I4)
C              ENDIF

C  GEGEBENER WERT DES FUNKTIONALS:

ISDE = ISDIST
               IZDE = IZDIST
               IF (MIPO.EQ.1) THEN
                  CALL GETBL (NSX,NSE,NZE, KB0, IS1,IZ1,LBLE,LBLE,ISDE,IZDE,
     +                 KB0MC)
                  CALL M5DIFBL (NSX,NSE,NZE, KB0MC,KB1,
     +                 IS1,IZ1, LBLE,LBLE, ITH1,
     +                 IDLUM)
               ELSEIF (MIPO.GT.1) THEN      ! INTERPOLATION:
                  IQUANT = 1                !   HIER NICHT FEINER.
                  ADZ = FLOAT(IZDE)/IQUANT
                  ADS = FLOAT(ISDE)/IQUANT
                  CALL GETBLAI (NSX,NSE,NZE, KB0,KB1,
     +                 IS1,IZ1,LBLE,LBLE,ADS,ADZ, W0,
     +                 KB0MC,KB1MC)
                  CALL M5DIFBL (NSX,NSE,NZE, KB0MC,KB1MC,
     +                 IS1,IZ1, LBLE,LBLE, ITH1,
     +                 IDLUM)
```

```
          ELSE
            STOP 'STOP FSBLMI: MIPO INVALID !'
          ENDIF

C SMOOTHNESS:
          MSW (ISW,IZW) = ISDE
          MZW (ISW,IZW) = IZDE
          CALL M6DVEC1 (NSVX,NSW,NZW, LBLE, MSW,MZW,
     +        ISW,IZW, ISW,IZW,  DVEC)
          DVEC = DVEC*PENALTY
C RESULT:
          DIST = IDLUM + DVEC
        DISTIST = DIST
        DLUMIST = IDLUM
        DVECIST = DVEC

C SUCHE NACH VERBESSERUNG:

DO IZDE = IZDMIN,IZDMAX              ! NOCH +-1 DAZU ?!!!
         DO ISDE = ISDMIN,ISDMAX

C LUMINANZDIFFERENZEN:

IF (MIPO.EQ.1) THEN
            CALL GETBL (NSX,NSE,NZE, KB0, IS1,IZ1,LBLE,LBLE,ISDE,IZDE,
     +         KB0MC)
            CALL M5DIFBL (NSX,NSE,NZE, KB0MC,KB1,
     +         IS1,IZ1, LBLE,LBLE, ITH1,
     +         IDLUM)
          ELSE
            IQUANT = 1                  !  HIER NOCH NICHT FEINER.
            ADZ = FLOAT(IZDE)/IQUANT
            ADS = FLOAT(ISDE)/IQUANT
            CALL GETBLAI (NSX,NSE,NZE, KB0,KB1,
     +         IS1,IZ1,LBLE,LBLE,ADS,ADZ, W0,
     +         KB0MC,KB1MC)
            CALL M5DIFBL (NSX,NSE,NZE, KB0MC,KB1MC,
     +         IS1,IZ1, LBLE,LBLE, ITH1,
     +         IDLUM)
          ENDIF     ! MIPO

C SMOOTHNESS:

MSW (ISW,IZW) = ISDE
          MZW (ISW,IZW) = IZDE
          CALL M6DVEC1 (NSVX,NSW,NZW, LBLE, MSW,MZW,
     +        ISW,IZW, ISW,IZW,  DVEC)
          DVEC = DVEC*PENALTY

C RESULT:

DIST = IDLUM + DVEC
          IF (DIST.LT.DMIN) THEN
            DMIN = DIST
            DLUMOPT = IDLUM
            DVECOPT = DVEC
            ISDOPT = ISDE
            IZDOPT = IZDE
          ENDIF
         ENDDO        ! ISDE
        ENDDO         ! IZDE

C FESTHALTEN:

IF (ITER.GT.1) THEN
          DSUM = DSUM - DISTF(1,ISW,IZW)
          DLUMSUM = DLUMSUM - DISTF(2,ISW,IZW)
        ENDIF
```

```
              DISTF(1,ISW,IZW) = DMIN
              DISTF(2,ISW,IZW) = DLUMOPT
              DSUM = DSUM + DMIN
              DLUMSUM = DLUMSUM + DLUMOPT

MSW (ISW,IZW) = ISDOPT
              MZW (ISW,IZW) = IZDOPT
              ISDE = ISDOPT
              IZDE = IZDOPT

C    UND ABSCHLIESSENDE MOTCOMPENSATION BZW INTERPOLATION:

IF (MIPO.EQ.1) THEN   ! KEINE INTERPOLATION
                 CALL GETBL (NSX,NSE,NZE, KB0, IS1,IZ1,LBLE,LBLE,ISDE,IZDE,
     +                 KB0MC)
              ELSE          ! MIPO.GT.1
                 IQUANT = 1                  ! BISHER FEST.
                 ADZ = FLOAT(IZDE)/IQUANT
                 ADS = FLOAT(ISDE)/IQUANT
                 CALL GETBLAI (NSX,NSE,NZE, KB0,KB1,
     +              IS1,IZ1,LBLE,LBLE,ADS,ADZ, W0,
     +              KB0MC,KB1MC)
                 DO IZ = IZ1,IZ1-1+LBLE
                 DO IS = IS1,IS1-1+LBLE
                    KB0MC(IS,IZ) = NINT ((1.-W0)*KB0MC(IS,IZ)+W0*KB1MC(IS,IZ))
                 ENDDO
                 ENDDO
              ENDIF

C    AUFTRAGSBUCH UPDATEN:

CHANGEDBL = ISDOPT.NE.ISDIST .OR. IZDOPT.NE.IZDIST
              IF (CHANGEDBL) THEN
                 CHANGED = .TRUE.
                 IF (ISW-1.GT.0) CHEF(1-ITOFRO,ISW-1,IZW) = .TRUE.
                 IF (IZW-1.GT.0) CHEF(1-ITOFRO,ISW,IZW-1) = .TRUE.
                 IF (ISW+1.LE.NSW) CHEF(1-ITOFRO,ISW+1,IZW) = .TRUE.
                 IF (IZW+1.LE.NZW) CHEF(1-ITOFRO,ISW,IZW+1) = .TRUE.
                 NCHANGED = NCHANGED+1
              ENDIF

IF (JADEBUG.EQ.1 .AND.
     +             (ISDMIN.NE.ISDMAX .OR. IZDMIN.NE.IZDMAX)) THEN
                 IF (.NOT.CHANGEDBL) THEN
                    WRITE(6,6554) IS1,IZ1,ISDIST,IZDIST,ISDOPT,IZDOPT,
     +                 ISDMIN,ISDMAX,IZDMIN,IZDMAX,
     +                 DISTIST,DLUMIST,DMIN,DLUMOPT
6554                FORMAT (' BLOCK'2I4' IST='2I3' NEU='2I3' AUS'4I3
     +                 /10X,'DIST(LUM)IST'2F8.1' DMIN'2F8.1' NOT CHANGED.')
                 ELSE         ! CHANGEDBL:
                    WRITE(6,6555) IS1,IZ1,ISDIST,IZDIST,ISDOPT,IZDOPT,
     +                 ISDMIN,ISDMAX,IZDMIN,IZDMAX,
     +                 DISTIST,DLUMIST,DMIN,DLUMOPT
6555                FORMAT (' BLOCK'2I4' IST='2I3' NEU='2I3' AUS'4I3
     +                 /10X,'DIST(LUM)IST'2F8.1' DMIN'2F8.1' CHANGED.')
C                   WRITE(6,6779) IS1,IZ1,ISDOPT,IZDOPT,DMIN,DLUMOPT,CHANGED
C6779               FORMAT ('  IS1,IZ1,ISDIST,IZDIST,DMIN,DLUMOPT'2I4,2X,2I3,
C    +                 2F8.1' CH='L1)
                 ENDIF        ! CHANGEDBL
              ENDIF

ENDIF              ! CHEF(ITOFRO,ISW,IZW)
           ENDDO              ! ISW
           ENDDO              ! IZW

C          WRITE(6,6553) ITER,ITOFRO,DSUM,DLUMSUM
           DVECSUM = DSUM - DLUMSUM
           WRITE(6,6553) ITER,NCHECKED,NCHANGED,DSUM,DLUMSUM,DVECSUM
```

```
C    NEUER WERT DES FUNKTIONALS:

DISTSUMF(ITER) = 0
            DLUMSUMF(ITER) = 0
            DVECSUMF(ITER) = 0
C    FUER ALLE BLOECKE:
            DO IZW = 1, NZW
            DO ISW = 1, NSW
C    BLOCKKOORDINATEN:
            IS1 = (ISW-1)*LBLE+1
            IZ1 = (IZW-1)*LBLE+1
            ISDE = MSW(ISW,IZW)
            IZDE = MZW(ISW,IZW)
            IF (MIPO.EQ.1) THEN
               CALL GETBL (NSX,NSE,NZE, KB0, IS1,IZ1,LBLE,LBLE,ISDE,IZDE,
     +            KB0MC)
               CALL M5DIFBL (NSX,NSE,NZE, KB0MC,KB1,
     +            IS1,IZ1, LBLE,LBLE, ITH1,
     +            IDLUM)
            ELSEIF (MIPO.GT.1) THEN       ! INTERPOLATION:
               IQUANT = 1                  !   HIER NICHT FEINER.
               ADZ = FLOAT(IZDE)/IQUANT
               ADS = FLOAT(ISDE)/IQUANT
               CALL GETBLAI (NSX,NSE,NZE, KB0,KB1,
     +            IS1,IZ1,LBLE,LBLE,ADS,ADZ, W0,
     +            KB0MC,KB1MC)
               CALL M5DIFBL (NSX,NSE,NZE, KB0MC,KB1MC,
     +            IS1,IZ1, LBLE,LBLE, ITH1,
     +            IDLUM)
            ELSE
               STOP 'STOP FSBLMI: MIPO INVALID !'
            ENDIF

C    SMOOTHNESS:
            CALL M6DVEC1 (NSVX,NSW,NZW, LBLE, MSW,MZW,
     +         ISW,IZW, ISW,IZW,   DVEC)
            DVEC = DVEC*PENALTY
C    RESULT:
            DIST = IDLUM + DVEC
            DISTIST = DIST
            DLUMIST = IDLUM
            DVECIST = DVEC
            DISTSUMF(ITER) = DISTSUMF(ITER) + DISTIST
            DLUMSUMF(ITER) = DLUMSUMF(ITER) + DLUMIST
            DVECSUMF(ITER) = DVECSUMF(ITER) + DVECIST
         ENDDO ! ISW
         ENDDO ! IZW
         DISTSUMF(ITER) = DISTSUMF(ITER) / (NSE*NZE)
         DLUMSUMF(ITER) = DLUMSUMF(ITER) / (NSE*NZE)
         DVECSUMF(ITER) = DVECSUMF(ITER) / (NSE*NZE)

WRITE(6,6811) LBLE,ITER,
     +        DISTSUMF(ITER),DLUMSUMF(ITER),DVECSUMF(ITER)
         WRITE(KIT,6811) LBLE,ITER,
     +        DISTSUMF(ITER),DLUMSUMF(ITER),DVECSUMF(ITER)

ENDDO                ! WHILE CHANGED

RETURN
      END

C*****************************************************************
C
      SUBROUTINE M5VAREA (NVBLSX,NVBLS,NVBLZ, MVBLS,MVBLZ, IGAP,
     +        ISV,IZV,
     +        ISVMIN,ISVMAX,
     +        IZVMIN,IZVMAX)
C
```

```
C   V.BRANDT        25.01.87
C   LAST UPDATE       "
C
C   CALCULATE SEARCH AREA DEPENDING ON SURROUNDING VECTORS.

C   I N P U T :
C   NVBLSX                     MAX. NO. OF VECTORS HOR.
C   NVBLS                      ACT. NO. OF VECTORS HOR.
C   NVBLZ                      ACT. NO. OF VECTORS VER.
C   MVBLS(IGAP,NVBLSX,NVBLZ)             VECTOR FIELD (HOR. SHIFT)
C   MVBLZ(IGAP,NVBLSX,NVBLZ)             VECTOR FIELD (VER. SHIFT)
C   IGAP
C   ISV,IZV            COORDINATES OF VECTOR.
C
C   O U T P U T :
C
C   ISVMIN,ISVMAX      SEARCH AREA HOR.
C   IZVMIN,IZVMAX      SEARCH AREA VER.
C
C*****************************************************************

INTEGER*2 MVBLS(IGAP,NVBLSX,*)
        INTEGER*2 MVBLZ(IGAP,NVBLSX,*)

C   DIRECTIONS FOR NEIGHBOURING PIXELS:

INTEGER*2 INEIS(8),INEIZ(8)
        DATA INEIS / 0,-1, 0, 1,-1,-1, 1, 1/    ! O,L,U,R, OL,UL,UR,OR
        DATA INEIZ /-1, 0, 1, 0,-1, 1, 1,-1/

C   CALCULATE MIN, MAX:

ISVMIN = MVBLS (1,ISV,IZV)
        ISVMAX = MVBLS (1,ISV,IZV)
        IZVMIN = MVBLZ (1,ISV,IZV)
        IZVMAX = MVBLZ (1,ISV,IZV)
        DO LFD = 1,8
           IZN = MAX (1,MIN (NVBLZ,IZV+INEIZ(LFD)))
           ISN = MAX (1,MIN (NVBLS,ISV+INEIS(LFD)))
           ISVMIN = MIN (ISVMIN, MVBLS(1,ISN,IZN))
           ISVMAX = MAX (ISVMAX, MVBLS(1,ISN,IZN))
           IZVMIN = MIN (IZVMIN, MVBLZ(1,ISN,IZN))
           IZVMAX = MAX (IZVMAX, MVBLZ(1,ISN,IZN))
        ENDDO

RETURN
        END

C*****************************************************************
C
        SUBROUTINE M6DVEC1 (NSVX,NSV,NZV, LBLO, MSV,MZV,
       +    ISV1,IZV1, ISV2,IZV2,
       +    DVEC)
C
C   V.BRANDT        16.02.87
C   LAST UPDATE       "
C
C   SMOOTHNESS OF VECTOR FIELD.
C   SUM OF NORMS OF DIFFERENCES TO THE FOUR NEIGHBOURING VECTORS, TAKING
C   INTO ACCOUNT THE BOUNDARY OF THE BLOCK.
C   THE RESULT IS THE SAME AS IF THE SMOOTHNESS WOULD BE CALCULATED FOR
C   EVERY PIXEL.
C
C   I N P U T :
    NSVX,NSV,NZV         DIMENSIONING VECTOR FIELD.
C   LBLO                 BLOCK SIZE
C   MSV(NSVX,NZV)        VECTOR FIELD (HOR. COMP.)
C   MZV(NSVX,NZV)        VECTOR FIELD (VER. COMP.)
```

```
C   ISV1,IZV1             UPPER LEFT VECTOR OF THE AREA OF INTEREST.
C   ISV2,IZV2             LOWER RIHHT VECTOR OF THE AREA OF INTEREST.
C
C   O U T P U T :
C   DVEC                  SUM OF DIFFERENCES.
C
C*****************************************************************

INTEGER*2 MSV (NSVX,NZV)
      INTEGER*2 MZV (NSVX,NZV)
      INTEGER*2 ISVD(4),IZVD(4)
      DATA ISVD / 1, 0,-1, 0/
      DATA IZVD / 0,-1, 0, 1/

DVEC = 0.
      DO IZV = IZV1,IZV2
      DO ISV = ISV1,ISV2

DVEC1 = 0.              ! PARTIAL SUM FOR 1 VECTOR
         ISDE = MSV (ISV,IZV)
         IZDE = MZV (ISV,IZV)

DO LFD = 1,4
            IZVN = MAX(1,MIN(NZV, IZV + IZVD(LFD)))
            ISVN = MAX(1,MIN(NSV, ISV + ISVD(LFD)))
            ISDEN = MSV (ISVN,IZVN)
            IZDEN = MZV (ISVN,IZVN)
            DVEC1 = DVEC1 + (ABS(ISDEN-ISDE) + ABS(IZDEN-IZDE))*LBLO
         ENDDO
               ! * LBLO, WEIL RAND DES BLOCKES LBLO PIXEL HAT.

DVEC = DVEC + DVEC1
      ENDDO
      ENDDO

RETURN
      END

C   PAT_SUBRO.FOR:
C             DATEI IOLIB.FOR
C             LAST UPDATE 02.02.87
C
C*********************************************************
C
      SUBROUTINE PICOLD (KIN, NSE,NZE,NPIC,NUV,IPIC1, NAME50)
C
C   V.BRANDT      02.02.87
C   LAST UPDATE     "
C
C   OEFFNEN EINER ALTEN BILDDATEI.
C
C   I N P U T :
C   KIN           KANALNUMMER. (1...99)
C
C   O U T P U T :
C   NSE           ANZAHL SPALTEN JE BILD.
C   NZE           ANZAHL ZEILEN  JE BILD.
C   NPIC          ANZAHL BILDER IN DER SEQUENZ.
C   NUV           1 FUER LUMINANZDATEI, 2 FUER CHROMINANZDATEI.
C   IPIC1         NUMMER DES ERSTEN BILDES, DAS GELESEN WERDEN SOLL.
C   NAME50        CHARACTER*50,  NAME DER EROEFFNETEN BILDES (INFODATEINAME).
C
C*********************************************************
C
      COMMON /PICINFOVB/ NSEF(99),NZEF(99),NUVF(99),NPICF(99),
     +           MINTF(99),IPIC1F(99),INTERACT

IF (KIN.LE.0) STOP 'PICOLD-STOP: KIN.LE.0!'
```

```
      CALL RDINFOB5 (KIN, NSE,NZE,NUV,NPIC,IPIC1,
     +           MINT, NAME50)
      NSEF(KIN) = NSE
      NZEF(KIN) = NZE
      NUVF(KIN) = NUV
      NPICF(KIN) = NPIC
      MINTF(KIN) = MINT
      IPIC1F(KIN) = IPIC1
      IF (MINT.EQ.0) THEN
         INTERACT = 0          ! BEI BYTE BLEIBTS BYTE, KEIN GEQUATSCHE.
      ELSE    ! MINT.EQ.1:
         INTERACT = 1          ! BEI INTEGER*2-DATEI ABFRAGE IN PICNEW.
      ENDIF

RETURN
      END

C*********************************************************
C
      SUBROUTINE PICNEW (KOU, NSE,NZE,NPIC,NUV)
C
C  V.BRANDT      02.02.87
C  LAST UPDATE      "
C
C  EROEFFNEN EINER NEUEN BILDDATEI.
C
C  I N P U T :
C  KOU          KANALNUMMER FUER DIESE DATEI.
C  NSE          ANZAHL SPALTEN JE BILD.
C  NZE          ANZAHL ZEILEN  JE BILD.
C  NPIC         ANZAHL BILDER IN DER SEQUENZ.
C  NUV          IST ES EINE LUMINANZ (1) ODER CHROMINANZ (2) DATEI?
C               MUSS MIT DEM LETZTEN PICOLD-AUFRUF UEBEREINSTIMMEN!
C
C*********************************************************
C
      COMMON /PICINFOVB/ NSEF(99),NZEF(99),NUVF(99),NPICF(99),
     +           MINTF(99),IPIC1F(99),INTERACT

IF (KOU.LE.0) STOP 'PICNEW-STOP: KOU.LE.0!'
      CALL FILGENB5 (KOU,NSE,NZE,NPIC,INTERACT, MINT)
      NSEF(KOU) = NSE
      NZEF(KOU) = NZE
      NUVF(KOU) = NUV
      NPICF(KOU) = NPIC
      MINTF(KOU) = MINT
      IPIC1F(KOU) = 1

RETURN
      END

C*****************************************************************
C
      SUBROUTINE PICREAD (KIN,NSX, KBILD, IPIC,IUV)
C
C  V.BRANDT      02.02.87
C  LAST UPDATE      "
C
C  BILD EINLESEN.
C
C  UEBERGABEGROESSEN:
C  I N P U T :
C  KIN          KANALNUMMER DER EINGABE.
C  NSX          SPALTENZAHL, MIT DER DAS BILDFELD DIMENSIONIERT IST.
C  IPIC         GEWUENSCHTE BILDNUMMER, BEZOGEN AUF DIE IN "PICNEW"
C               DEFINIERTE SEQUENZ.
C  IUV          BEI LUMINANZDATEI: IRRELEVANT.
C               BEI CHROMINANZ: 1 FUER 'U', 2 FUER 'V'.
```

```
C  O U T P U T :
C  KBILD(NSX,NZE)       INTEGER*2      DAS EINGELESENE BILD.
C                       ES WERDEN NUR NSE SPALTEN, NZE ZEILEN BELEGT.
C                       NSE,NZE SIND MIT "PICNEW" DEFINIERT WORDEN.
C
C*******************************************************************

COMMON /PICINFOVB/ NSEF(99),NZEF(99),NUVF(99),NPICF(99),
     +        MINTF(99),IPIC1F(99),INTERACT
      INTEGER*2 KBILD(NSX,*)

IF (KIN.LE.0) STOP 'STOP-PICREAD: KIN.LE.0!'
      NUVH = NUVF(KIN)
      IF (NUVH.EQ.1) THEN
         IUVH = 1
      ELSE
         IUVH = IUV
      ENDIF
      NZEH = NZEF(KIN)
      NSEH = NSEF(KIN)
      NPICH = NPICF(KIN)
      MINTH = MINTF(KIN)
      IPICH = IPIC-1+IPIC1F(KIN)

DO IZ = 1,NZEH
        CALL RDLINEB1 (KIN,NSEH,NZEH,NUVH,NPICH, IZ,IUVH,IPICH,
     +     KBILD(1,IZ),MINTH)
      ENDDO           ! IZ

RETURN
      END

C*******************************************************************
C
      SUBROUTINE PICWRITE (KOU,NSX, KBILD, IPIC,IUV,JABEGR)
C
C  V.BRANDT     02.02.87
C  LAST UPDATE   "
C
C  BILD AUSGEBEN.
C
C  UEBERGABEGROESSEN:
C  I N P U T :
C  KOU          KANALNUMMER DER AUSGABE.
   NSX          SPALTENZAHL, MIT DER DAS BILDFELD DIMENSIONIERT IST.
C  KBILD(NSX,NZE)       INTEGER*2      DAS AUSZUGEBENDE BILD.
C                       ES WERDEN NSE SPALTEN, NZE ZEILEN AUSGEGEBEN.
C                       NSE,NZE SIND MIT "PICNEW" DEFINIERT WORDEN.
C  IPIC         GEWUENSCHTE BILDNUMMER.
C  IUV          BEI LUMINANZDATEI: IRRELEVANT.
C               BEI CHROMINANZ: 1 FUER 'U', 2 FUER 'V'.
C  JABEGR       WERTEBEREICH BEGRENZEN?: 0=NEIN, 1="AUF 0...255",
C                                        2=NACH CCITT.
C
C*******************************************************************

COMMON /PICINFOVB/ NSEF(99),NZEF(99),NUVF(99),NPICF(99),
     +        MINTF(99),IPIC1F(99),INTERACT
      INTEGER*2 KBILD(NSX,*)

IF (KOU.LE.0) STOP 'STOP-PICWRITE: KOU.LE.0!'
      NUVH = NUVF(KOU)
      IF (NUVH.EQ.1) THEN
         IUVH = 1
      ELSE
         IUVH = IUV
      ENDIF
```

```
              NZEH  = NZEF(KOU)
              NSEH  = NSEF(KOU)
              NPICH = NPICF(KOU)
              MINTH = MINTF(KOU)
              IF (MINTH.EQ.1) THEN     ! BEI INTEGER*2
                 JABEGRH = 0
              ELSE                     ! BEI BYTE.
                 JABEGRH = JABEGR
              ENDIF

DO IZ = 1,NZEH
                 CALL WRLINEB2 (KOU,NSEH,NZEH,NUVH,NPICH, IZ,IUVH,IPIC,
     +              KBILD(1,IZ),MINTH, JABEGRH)
              ENDDO ! IZ
              RETURN
              END

C***************************************************************
C
         SUBROUTINE RDINFOB5 (KI, NSPA,NZEI,NUV,NBILD,IPIC1,
     +              INT, NAMINF50)
C
C  V.BRANDT        21.05.84
C  LAST UPDATE     29.01.86
C
C  DATEN FUER EINGABE EINLESEN UND RDINFO AUFRUFEN.
C  22.03.85:  INT STATT INTIO GIBT AN OB BYTE ODER INTEGER-DATEI.
C  20.08.85:  NUV BEI FARBE KORRIGIERT.
C             NAMINF50 UEBERGEBEN.
C  17.12.85:  VERBOSITY = 0.
C  29.01.86:  ABFRAGE ERSTES UND LETZTES BILD.
C
C  KI      (INPUT)         EINGABEBILD-KANALNUMMER.
C  INT     (OUTPUT)        = 0 : BYTE-EINGABE;
C                          = 1 : INTEGER*2.
C  NSPA         (OUT)      ANZAHL SPALTEN.
C  NZEI         (OUT)      ANZAHL ZEILEN.
C  NUV          (OUT)      =1 BEI LUMINANZ, =2 BEI CHROMINANZDATEIEN.
C  NBILD        (OUT)      ANZAHL BILDER.
C  NAMINF50*50  (OUT)      CHARACTER: INPUT-DATEINAME.
C
C***************************************************************

CHARACTER NAMINF50*50,CTYP*10,CHRLUM*50,
     +      NEWNAM*50,KENNB*3,DEVDIR*50, ANSWER
         LOGICAL GOON, LCHROM

IERR = 99
         DO WHILE (IERR.NE.0)
         WRITE(6,2011)
2011     FORMAT(' ??? NAME DER INFODATEI (DEF = .00I):   'T50' ',$)
         READ(5,1000) MUCH,NAMINF50
1000     FORMAT(Q,A50)

C  ALS DEFAULT .00I ANHAENGEN:

IWO2 = INDEX(NAMINF50,']')
         IWO  = INDEX(NAMINF50(IWO2+1:),'.')
         IF (IWO.EQ.0) NAMINF50 = NAMINF50(:MUCH)//'.00I'

C  IST ES EINE CHROMINANZ-INFO-DATEI?

IWO = INDEX(NAMINF50(IWO2+1:),'.')
         LCHROM = (NAMINF50(IWO2+IWO+3:IWO2+IWO+3).EQ.'J')
         NUV = 1
         IF (LCHROM) NUV = 2

C  ALTE DATEI EROEFFNEN:
```

```
              CALL RDINFO(KI,NAMINF50,NSPA,NZEI,RATE,CTYP,NBILD,CHRLUM,IERR)

IF (IERR.NE.0) THEN
                WRITE(6,*) '>>AUS RDINFO: FEHLER IERR=',IERR
                WRITE(6,6001)
6001          FORMAT (' --- FOLGENDES WURDE AUS DER INFODATEI GELESEN: ---')
              WRITE(6, 2000) NAMINF50,NSPA,NZEI,RATE,CTYP,NBILD,CHRLUM, NUV
2000          FORMAT(' DATEINAME          :'A50/' ANZAHL SPALTEN     :'I4/
     +        ' ANZAHL ZEILEN        :'I4/' ABTASTRATE         :'F6.3/
     +        ' BYTE ODER INT*2      :'A10/' ANZAHL BILDER      :'I4/
     +        ' "CHROM"-INFODATNAME:'A50/' LUM(1) OD. CHROM(2):'I4 )
              ENDIF   ! IERR
              ENDDO   ! DO WHILE IERR

C     FESTSTELLEN, OB INTEGER- ODER BYTE-DATEI:

INT = 0
              IF (INDEX(CTYP,'B').EQ.0) INT = 1     ! FALLS NICHT "BYTE".

IF (NBILD.GT.1) THEN
                WRITE(6,6700) 1,NBILD
6700            FORMAT(' ERSTES UND LETZTES BILD (DEFAULT='I3','I3'):')
                READ(5,5600) MUCH,IPIC1,IPICL
5600            FORMAT(BN,Q,2I)
                IF (MUCH.EQ.0) THEN
                  IPIC1 = 1
                  IPICL = NBILD
                ENDIF
              ELSE
                IPIC1 = 1
                IPICL = NBILD
              ENDIF
              NBILD = IPICL-IPIC1+1

RETURN
              END

C****************************************************
C
              SUBROUTINE FILGENB5 (KO,NSPA,NZEI,NBILD,INTERACT, INT)
C
C     V.BRANDT      21.05.84
C     LAST UPDATE   17.12.85
C
C     EINLESEN VON DATEN FUER FILGEN, DANN FILGEN-AUFRUF.
C     20.07.84:   NSPA,NZEI  ARE  INPUT.
C     25.07.84:   KORREKTUR.
C                 NUN NBILD ALS INPUT.
C     22.03.85:   INT STATT INTIO GIBT AN OB DATEI BYTE ODER INTEGER.
C                 UEBERGABE DEVDIR0.
C     17.12.85:   DEVDIR0 WIRD NICHT MEHR UEBERGEBEN. IST ZU KOMPLIZIERT.
C     02.04.87:   INTERACT: QUATSCHEN ODER NICHT.
C
C     KO              (INPUT)         KANALNUMMER.
C     NSPA            (IN)     ANZAHL SPALTEN.
C     NZEI            (IN)     ANZAHL ZEILEN.
C     NBILD           (IN)     ANZAHL BILDER.
CC    DEVDIR0         (IN)     CHARACTER*50: PLATTE UND DIRECTORY, WO DIE NEUE
C                              DATEI ANGELEGT WERDEN SOLL, WENN MAN NICHTS
C                              ANDERES ANGIBT, Z.B. 'DRD0:[BR3]'.
C     INT             (OUT)        =0 WENN DATEI VOM TYP BYTE;
C                                  =1 WENN VOM TYP INTEGER*2.
C     INTERACT        (IN)     =0: KEINE ABFRAGE,
C                              =1: ABFRAGE.
C
C****************************************************

C     PARAMETER INTERACT=0      ! KEINE AENDERUNGEN MEHR IN FILGEN.
C                 (SIEHE DRA0:[PUBLIC]FILGEN.FOR)
```

```
       CHARACTER NAMINF*50,CTYP*10,CHRLUM*50, CHROM*50,COMM*60,
     +   NEWNAM*50,KENNB*3,DEVDIR*50, ANSWER
       CHARACTER DEVDIR0*50    ! DEVDIR DEFAULT.
       LOGICAL GOON, LCHROM

C INI:

CTYP = ' '
       CHROM = ' '
       CHRLUM = ' '
       RATE = -1.
C      NBILD = 0
       COMM = ' '

WRITE(6,2012)
2012   FORMAT(/' ??? DEVICE:[DIRECTORY] FUER AUSGABE-BILDDATEI:'
     +   )
       READ(5, 1000) MUCH, DEVDIR

WRITE(6,2013)
2013   FORMAT(' ??? 3 KENNBUCHSTABEN:    'T60' ',$)
       READ(5, 1000) MUCH, KENNB
1000   FORMAT(Q,A50)

WRITE(6,2004)
2004   FORMAT(' ??? VERSIONSNUMMER:    'T60' ',$)
       READ(5,1001) IVERS
1001   FORMAT(BN,I10)

C      WRITE(6,2005)
C2005  FORMAT(' #### NEUE INFODATEI (PRELIMINARY): ####')

CALL FILGEN(KO,NEWNAM,KENNB,IVERS,DEVDIR,INTERACT,IERR)
       IF (IERR.NE.0) WRITE(6,*) 'FEHLER IERR=',IERR

CC KONTROLLE:
C      WRITE(6, 2000) NEWNAM,RATE,NBILD,CTYP,CHRLUM,NSPA,NZEI

CALL WRINFO(KO,RATE,NBILD,CTYP,CHROM,CHRLUM,NSPA,NZEI,COMM)

C ... UND KONTROLLE:

CALL RDINFO(KO,NEWNAM,NSPA,NZEI,RATE,CTYP,NBILD,CHRLUM,IERR)
       WRITE(6,6001)
6001   FORMAT (' #### NEUE INFODATEI: ####')
C      WRITE(6, 2000) NEWNAM,NSPA,NZEI,RATE,CTYP,NBILD,CHRLUM
       WRITE(6, 2000) NEWNAM,RATE,NBILD,CTYP,CHRLUM,NSPA,NZEI
2000   FORMAT(' DATEINAME          :'A50/
     +   ' ABTASTRATE         :'F6.3/
     +   ' ANZAHL BILDER      :'I4/
     +   ' BYTE ODER INT*2    :'A10/
     +   ' "CHROM"-INFONAME   :'A50/
     +   ' ANZAHL SPALTEN     :'I4/
     +   ' ANZAHL ZEILEN      :'I4)
       IF (IERR.NE.0) THEN
         WRITE(6,*) '>>FEHLER IERR=',IERR
         STOP
       ENDIF

C BYTE/INTEGER:

INT = 0
       IF (INDEX(CTYP,'B').EQ.0) INT = 1       ! FALLS NICHT "BYTE".

RETURN
       END

C*****************************************************************
C
```

```
      SUBROUTINE RDLINEB1 (KI, NSPA,NZEI,NUV,NBILD, IZ,IUV,IBILD,
     +   IZEILE, MINT)
C
C  V.BRANDT      12.11.84
C  LAST UPDATE   15.07.85
C
C  EINLESEN EINER BILDZEILE OHNE CACHE.
C  15.07.85:  NAME RDLINE.
C
C  I N P U T:
C  KI              :  KANALNUMMER DES EINGABE-BILDES.
C  NSPA            :  ANZAHL SPALTEN PRO BILD.
C  NZEI            :  ANZAHL ZEILEN PRO BILD.
C  NUV             :  ANZAHL TEILBILDER PRO BILDNUMMER.
C                     = 1 BEI LUMINANZ-DATEI,
C                     = 2 BEI CHROMINANZ.
C  NBILD           :  ANZAHL BILDER DER SEQUENZ.
C  IZ              :  NUMMER DER ZU LESENDEN ZEILE DES BILDES.
C  IUV             :  NUMMER DES TEILBILDES.
C  IBILD           :  NUMMER DES ZU LESENDEN BILDES EINER SEQUENZ.
C  MINT            :  = 0 : DAS BILD IST VOM TYP BYTE.
C                     = 1 : DAS BILD IST VOM TYP INTEGER*2.
C
C  O U T P U T:
C  IZEILE(NSPA)    :  GELESENE ZEILE, IM FORMAT INTEGER*2
C
C***********************************************************

INTEGER*2 IZEILE(NSPA)
      BYTE BZEILE(1024),IHB
      EQUIVALENCE (IH,IHB)

C  ABSOLUTEN ZEILENINDEX ERMITTELN:

IZCA = ((IBILD-1)*NUV+(IUV-1)) * NZEI + IZ

C  ZEILE EINLESEN:

IF (MINT.EQ.0) THEN  !  BYTE-EINGABE:
          READ(KI'IZCA) (BZEILE(IS),IS=1,NSPA)
          DO IS = 1,NSPA
            IHB = BZEILE(IS)
            IZEILE(IS) = IH
          ENDDO
        ELSE                 !  INTEGER-INPUT:
          READ(KI'IZCA) (IZEILE(IS),IS=1,NSPA)
        ENDIF

RETURN
      END

C***********************************************************
C
      SUBROUTINE WRLINEB2 (KO, NSPA,NZEI,NUV,NBILD, IZ,IUV,IBILD,
     +   BZEILE, MINT, JABEGR)
C
C  V.BRANDT      12.11.84
C  LAST UPDATE   18.02.86
C
C  SCHREIBEN EINER BILDZEILE OHNE CACHE-ZWISCHENSPEICHER.
C  15.07.85:  NAME WRLINE.
C  29.01.86:  BYTE-AUSGABE SCHNELLER. WERTEBEREICH MUSS BEREITS
C                STIMMEN ! WIRD NICHT MEHR BEGRENZT !
C  04.02.86:  MIT OPTIONALER WERTEBEREICHSBEGRENZUNG.
C  18.02.86:  NACH CCITT BEGRENZEN BEI JABEGR=2.
C
C  I N P U T:
C  KO              :  KANALNUMMER DES AUSGABE-BILDES.
```

```
C  NSPA              : ANZAHL SPALTEN PRO BILD.
C  NZEI              : ANZAHL ZEILEN PRO BILD.
C  NUV               : ANZAHL TEILBILDER PRO BILDNUMMER.
C                     = 1 BEI LUMINANZ-DATEI,
C                     = 2 BEI CHROMINANZ.
C  NBILD             : ANZAHL BILDER DER SEQUENZ.
C  IZ                : NUMMER DER ZU LESENDEN ZEILE DES BILDES.
C  IUV               : NUMMER DES TEILBILDES.
C  IBILD             : NUMMER DES ZU LESENDEN BILDES EINER SEQUENZ.
C  MINT              : = 0 : DIE AUSGABE-BILDDATEI IST VOM TYP BYTE.
C                     = 1 : DIE AUSGABE-BILDDATEI IST VOM TYP INTEGER*2.
C  BZEILE(2,NSPA)    : HIER UEBERGIBT MAN IZEILE(NSPA), INTEGER*2.
C                    : FUER INTEGER-BYTE WANDLUNG.
C  JABEGR            : = 1 : WERTEBEREICH BEGRENZEN BEI BYTE-AUSGABE.
C                     = 0 : NICHT MEHR BEGRENZEN.
C
C************************************************************

PARAMETER NSPAX=1024    ! MAX. ZEILENLAENGE.
       BYTE BZEILE(2,NSPA)

INTEGER*2 IZEILE(NSPAX)
       BYTE BWORD(2)
       INTEGER*2 IWORD, IOUTMIN,IOUTMAX
       EQUIVALENCE (BWORD,IWORD)

C  ABSOLUTEN ZEILENINDEX ERMITTELN:

NZCAMAX = NZEI*NUV*NBILD
       IZCA = ((IBILD-1)*NUV+(IUV-1)) * NZEI + IZ
       IF (IZCA.GT.NZCAMAX) THEN
          WRITE(6,*)' CACHZOUB1: LINE INDEX EXCEEDS:'
          WRITE(6,*)' NZEI,NUV,NBILD,IZ,IUV,IBILD:'
          WRITE(6,*)  NZEI,NUV,NBILD,IZ,IUV,IBILD
       ENDIF

C  WERTEBEREICHSGRENZEN ERMITTELN:

IF (JABEGR.EQ.1) THEN
          IOUTMIN = 0
          IOUTMAX = 255
       ELSEIF (JABEGR.EQ.2) THEN          ! NACH CCITT:
          IF (NUV.EQ.1) THEN     ! LUMINANZ:
             IOUTMIN = 16
             IOUTMAX = 235
          ELSEIF (NUV.EQ.2) THEN            ! CHROMINANZ
             IOUTMIN = 16
             IOUTMAX = 239                  ! ERGIBT 224 WERTE, MITTE BEI 127.5
          ELSE
             STOP 'WRLINE: NUV FALSCH.'
          ENDIF
       ELSEIF (JABEGR.GT.0) THEN
          STOP 'WRLINE: JABEGR.GT.0, ABER .NE. 1 ODER 2 !'
       ENDIF

C  ZEILE SCHREIBEN:

IF (MINT.EQ.0) THEN ! BYTE-AUSGABE:
             IF (JABEGR.NE.0) THEN    ! WERTE BEGRENZEN:
                DO IS = 1,NSPA
                   BWORD(1) = BZEILE(1,IS)
                   BWORD(2) = BZEILE(2,IS)
                   IWORD = MAX (IOUTMIN,MIN (IOUTMAX,IWORD) )
                   BZEILE(1,IS) = BWORD(1)
                ENDDO
             ENDIF     ! BEGRENZEN
             WRITE(KO'IZCA) (BZEILE(1,IS),IS=1,NSPA)
          ELSE                       ! INTEGER-OUTPUT:
             DO IS = 1,NSPA
```

```
              BWORD(1) = BZEILE(1,IS)
              BWORD(2) = BZEILE(2,IS)
              IZEILE(IS) = IWORD
            ENDDO
            WRITE(KO'IZCA) (IZEILE(IS),IS=1,NSPA)
          ENDIF

RETURN
       END

C****************************************************
C
       SUBROUTINE BEGRENZ1 (NSPAX,NSPA,NZEI,IMIN,IMAX,IBILD)
C
C  25.09.86
C
C  WERTEBEREICH DER PIXEL BEGRENZEN AUF IMIN,IMAX.
C
C****************************************************

INTEGER*2 IBILD (NSPAX,NZEI)

DO IZ = 1,NZEI
       DO IS = 1,NSPA
         IBILD(IS,IZ) = MAX (IMIN,MIN (IMAX,IBILD(IS,IZ) ))
       ENDDO
       ENDDO
       RETURN
       END

C********************************************************************
C
       SUBROUTINE COPYI2 (NSX,NSPA,NZEI,KB0,KB1)
C
C  COPY IMAGE KB0 TO KB1.
C
C********************************************************************

INTEGER*2 KB0(NSX,NZEI), KB1(NSX,NZEI)
       DO IZ = 1,NZEI
       DO IS = 1,NSPA
         KB1(IS,IZ) = KB0(IS,IZ)
       ENDDO
       ENDDO
       RETURN
       END

C********************************************************************
C
       SUBROUTINE SETCI2 (NSX,NSPA,NZEI,IWERT, KB1)

C  SET IMAGE KB1 = IWERT.
C
C********************************************************************

INTEGER*2 KB1(NSX,NZEI)
       DO IZ = 1,NZEI
       DO IS = 1,NSPA
         KB1(IS,IZ) = IWERT
       ENDDO
       ENDDO
       RETURN
       END

C********************************************************************
C
       SUBROUTINE LIKO2 (NSPA,LINE1,LINE2,A1,A2,C, LINOU)
C
```

```
C LINOU = A1*LINE1+A2*LINE2 + C  (LINEAR COMBINATION).
C
C*****************************************************************
      INTEGER*2 LINE1(NSPA),LINE2(NSPA), LINOU(NSPA)
      DO IS = 1,NSPA
        LINOU(IS) = NINT (LINE1(IS)*A1+LINE2(IS)*A2+C)
      ENDDO
      RETURN
      END

C*****************************************************************
C
      SUBROUTINE GETBL (NSX,NSE,NZE, KB0, IS1,IZ1,LBLS,LBLZ,IDS,IDZ,
     +    KB1)
C
C V.BRANDT     06.02.87
C LAST UPDATE  16.02.87
C
C  OPY BLOCK OF KB0 TO KB1 MIT ADRESSEN-OFFSET IDS,IDZ.
C
C  I N P U T :
C NSX                MAX. SPALTENZAHL
C NSE,NZE            AKT. GROESSE DES BILDES.
C KB0(NSX,NZE)       INTEGER*2:     BILD
C IS1,IZ1            LI. OBERE BLOCK-KOORDINATEN.
C LBLS,LBLZ          BLOCKSIZE HORI, VERT.
C IDS,IDZ            OFFSET, INTEGER.
C
C  O U T P U T :
C KB1(NSX,NZE)       INTEGER*2:     BILD
C
C*****************************************************************
      INTEGER*2 KB0 (NSX,NZE)
      INTEGER*2 KB1 (NSX,NZE)

C FUER ALLE PIXEL IM BLOCK:

DO IZ = IZ1,IZ1-1+LBLZ
        IZMC = MAX(1,MIN(NZE, IZ+IDZ))
        DO IS = IS1,IS1-1+LBLS
          ISMC = MAX(1,MIN(NSE, IS+IDS))
          KB1 (IS,IZ) = KB0 (ISMC,IZMC)
        ENDDO
      ENDDO

RETURN
      END

C*****************************************************************
C
      SUBROUTINE GETBLIM (NSX,NSE,NZE, KB0, IS1,IZ1,LBLS,LBLZ,IDS,IDZ,
     +    JAMASK,MASK,
     +    KB1)
C
C V.BRANDT     06.02.87
C LAST UPDATE  "
C
C COPY BLOCK OF KB0 TO KB1 MIT ADRESSEN-OFFSET IDS,IDZ.
C
C  I N P U T :
C NSX                MAX. SPALTENZAHL
C NSE,NZE            AKT. GROESSE DES BILDES.
C KB0(NSX,NZE)       INTEGER*2:     BILD
C IS1,IZ1            LI. OBERE BLOCK-KOORDINATEN.
C LBLS,LBLZ          BLOCKSIZE HORI, VERT.
C IDS,IDZ            OFFSET, INTEGER.
```

```
C  JAMASK                        0/1: C/U-MASKE ANWENDEN?
C  MASK(NSX,NZE)                 INTEGER*2
C
C  O U T P U T :
C  KB1(NSX,NZE)                  INTEGER*2:      BILD
C
C*******************************************************************
       INTEGER*2 KB0 (NSX,NZE)
       INTEGER*2 KB1 (NSX,NZE)
       INTEGER*2 MASK (NSX,NZE)

C  FUER ALLE PIXEL IM BLOCK:

DO IZ = IZ1,IZ1-1+LBLZ
       DO IS = IS1,IS1-1+LBLS
         IF (JAMASK.EQ.1 .AND. MASK(IS,IZ).LE.0) THEN
           ISMC = IS
           IZMC = IZ
         ELSE
           ISMC = MAX(1,MIN(NSE, IS+IDS))
           IZMC = MAX(1,MIN(NZE, IZ+IDZ))
         ENDIF
         KB1 (IS,IZ) = KB0 (ISMC,IZMC)
       ENDDO
       ENDDO

RETURN
       END

C*******************************************************************
C
       SUBROUTINE GETBLAI (NSX,NSE,NZE, KB0,KB1,
     +    IS1,IZ1,LBLS,LBLZ,ADS,ADZ, W0,
     +    KB0MC,KB1MC)
C
C  V.BRANDT      06.02.87
C  LAST UPDATE    "
C
C  COPY KB0 TO KB0MC, KB1 TO KB1MC WITH ADDRESSING OFFSET ADS,ADZ; THIS
C  OFFSET IS SHARED: W0*(ADS,ADZ) IS APPLIED TO KB0;
C                   (W0-1)*(ADS,ADZ) IS APPLIED TO KB1.
C  FOR MOTION COMPENSATED INTERPOLATION.
C
C  I N P U T :
C  NSX                 MAX. SPALTENZAHL
C  NSE,NZE             AKT. GROESSE DES BILDES.
C  KB0(NSX,NZE)        INTEGER*2:      BILD
C  KB1(NSX,NZE)        INTEGER*2:      BILD
C  IS1,IZ1             LI. OBERE BLOCK-KOORDINATEN.
C  LBLS,LBLZ           BLOCKSIZE HORI, VERT.
C  ADS,ADZ             OFFSET (HORI, VERT)
C  W0                  WEIGHT (0.0...1.0)
C
C  O U T P U T :
C  KB0MC(NSX,NZE)      INTEGER*2:      BILD
C  KB1MC(NSX,NZE)      INTEGER*2:      BILD
C
C*******************************************************************
       INTEGER*2 KB0 (NSX,NZE)
       INTEGER*2 KB1 (NSX,NZE)
       INTEGER*2 KB0MC (NSX,NZE)
       INTEGER*2 KB1MC (NSX,NZE)

C  CALCULATE PARTIAL OFFSETS FOR IMAGE KB0MC:

ADSW = W0*ADS
       ADZW = W0*ADZ
```

```
C   COMPUTE KB0MC:

IDS = NINT (ADSW-.5)
         ARS = ADSW - IDS              ! REST, ZWISCHEN 0 UND 1.
         IDZ = NINT (ADZW-.5)
         ARZ = ADZW - IDZ              ! REST, ZWISCHEN 0 UND 1.

C   FOR ALL PIXELS IN THE BLOCK:

DO IZ = IZ1,IZ1-1+LBLZ
         DO IS = IS1,IS1-1+LBLS
            ISL = MAX(1,MIN(NSE, IS+IDS))
            ISH = MAX(1,MIN(NSE, IS+IDS+1))
            IZL = MAX(1,MIN(NZE, IZ+IDZ))
            IZH = MAX(1,MIN(NZE, IZ+IDZ+1))
            APEL0 = (KB0(ISL,IZL)*(1.-ARS)+KB0(ISH,IZL)*ARS) * (1.-ARZ)
       +          + (KB0(ISL,IZH)*(1.-ARS)+KB0(ISH,IZH)*ARS) * ARZ
            KB0MC(IS,IZ) = NINT (APEL0)
         ENDDO   ! IS
         ENDDO   ! IZ

C   CALCULATE PARTIAL OFFSETS FOR IMAGE KB1MC:

ADSW = (W0-1.)*ADS
         ADZW = (W0-1.)*ADZ

C   COMPUTE KB1MC:

IDS = NINT (ADSW-.5)
         ARS = ADSW - IDS              ! REST, ZWISCHEN 0 UND 1.
         IDZ = NINT (ADZW-.5)
         ARZ = ADZW - IDZ              ! REST, ZWISCHEN 0 UND 1.

C   FOR ALL PIXELS IN THE BLOCK:

DO IZ = IZ1,IZ1-1+LBLZ
         DO IS = IS1,IS1-1+LBLS
            ISL = MAX(1,MIN(NSE, IS+IDS))
            ISH = MAX(1,MIN(NSE, IS+IDS+1))
            IZL = MAX(1,MIN(NZE, IZ+IDZ))
            IZH = MAX(1,MIN(NZE, IZ+IDZ+1))
            APEL0 = (KB1(ISL,IZL)*(1.-ARS)+KB1(ISH,IZL)*ARS) * (1.-ARZ)
       +          + (KB1(ISL,IZH)*(1.-ARS)+KB1(ISH,IZH)*ARS) * ARZ
            KB1MC(IS,IZ) = NINT (APEL0)
         ENDDO   ! IS
         ENDDO   ! IZ

RETURN
         END

C*****************************************************************
C
         SUBROUTINE GETBLAM (NSX,NSE,NZE, KB0, IS1,IZ1,LBLS,LBLZ,ADS,ADZ,
       +    JAMASK,MASK,
       +    KB1)
C
C   V.BRANDT      06.02.87
C   LAST UPDATE    "
C
C   COPY KB0 NACH KB1 MIT ADRESSEN-OFFSET ADS.,ADZ.
C
C   I N P U T :
C   NSX                   MAX. SPALTENZAHL
C   NSE,NZE               AKT. GROESSE DES BILDES.
C   KB0(NSX,NZE)          INTEGER*2:       BILD
C   IS1,IZ1               LI. OBERE BLOCK-KOORDINATEN.
C   LBLS,LBLZ             BLOCKSIZE HORI, VERT.
C   ADS,ADZ               OFFSET (HORI, VERT)
```

```
C  JAMASK                   0/1: C/U-MASKE ANWENDEN?
C  MASK(NSX,NZE)            INTEGER*2
C
C  O U T P U T :
C  KB1(NSX,NZE)             INTEGER*2:        BILD
C
C*******************************************************************
       INTEGER*2 KB0 (NSX,NZE)
       INTEGER*2 KB1 (NSX,NZE)
       INTEGER*2 MASK (NSX,NZE)

C  FUER ALLE PIXEL IM BLOCK:

DO IZ = IZ1,IZ1-1+LBLZ
       DO IS = IS1,IS1-1+LBLS
         IF (JAMASK.EQ.1 .AND. MASK(IS,IZ).LE.0) THEN
           KB1 (IS,IZ) = KB0 (IS,IZ)
         ELSE            ! MIT SHIFT:
           CALL GETPEL (NSX,NSE,NZE, KB0, IS,IZ, ADS,ADZ, IPEL)
           KB1 (IS,IZ) = IPEL
         ENDIF
       ENDDO
       ENDDO

RETURN
       END

C*******************************************************************
C
       SUBROUTINE GETPEL (NSX,NSE,NZE, KB0, IS,IZ, ADS,ADZ, IPEL)
C
C  V.BRANDT     06.02.87
C  LAST UPDATE    "
C
C  HOLE EIN PIXEL AUS BILD KB0, UND ZWAR MIT OFFSET ADS,ADZ AUF DIE
C  ADRESSE IS,IZ.
C  MIT BILINEARER INTERPOLATION.
C
C  I N P U T :
C  NSX                      MAX. SPALTENZAHL
C  NSE,NZE                  AKT. BILDSIZE
C  KB0(NSX,NZE)             INTEGER*2:        BILD
C  IS,IZ                    PIXELKOORDINATEN
C  ADS,ADZ                  OFFSET (HORI, VERT)
C
C  O U T P U T :
C  IPEL                     DER PIXELWERT.
C
C*******************************************************************
       INTEGER*2 KB0 (NSX,NZE)
C  4 BENACHBARTE PIXEL ERMITTELN UND BILINEAR-FORMEL:

IDS = NINT (ADS-.5)
       ARS = ADS - IDS      ! REST, ZWISCHEN 0 UND 1.
       IDZ = NINT (ADZ-.5)
       ARZ = ADZ - IDZ      ! REST, ZWISCHEN 0 UND 1.

IS0 = MAX(1,MIN(NSE, IS+IDS))
       IS1 = MAX(1,MIN(NSE, IS+IDS+1))
       IZ0 = MAX(1,MIN(NZE, IZ+IDZ))
       IZ1 = MAX(1,MIN(NZE, IZ+IDZ+1))

APEL0 = (KB0(IS0,IZ0)*(1.-ARS)+KB0(IS1,IZ0)*ARS) * (1.-ARZ)
      +      + (KB0(IS0,IZ1)*(1.-ARS)+KB0(IS1,IZ1)*ARS) * ARZ
       IPEL = NINT (APEL0)

RETURN
       END
```

```
C*********************************************************
C
        SUBROUTINE M5DIFBL (NSX,NSE,NZE, KB0,KB1,
      +             IS1,IZ1, LBLS,LBLZ, IDIFLMAX,
      +             IDIFABS)
C
C  V.BRANDT       19.01.87
C  LAST UPDATE    25.01.87
C
C  COMPUTES SUM OF ABSOLUTE FRAME DIFFERENCES BETWEEN BLOCKS OF PIXELS
C  OF TWO IMAGES.
C
C  I N P U T :
C  NSX             MAX NUMBER OF COLUMNS.
C  NSE             ACTUAL NUMBER OF COLUMNS
C  NZE             ACTUAL NUMBER OF LINES
C  KB0(NSX,NZE)         INPUT IMAGE #0.
C  KB1(NSX,NZE)         INPUT IMAGE #1.
C  IS1,IZ1         ADDRESS OF FIRST PIXEL OF BLOCK (HOR.,VERT.)
C  LBLS,LBLZ       SIZE OF BLOCK (HOR.,VERT.)
C  IDIFLMAX        MAX. DIFF FOR EACH PIXEL.
C
C  O U T P U T :
C  IDIFABS         SUM OF ABS OF DIFFERENCES.
C
C*********************************************************

INTEGER*2 KB0(NSX,NZE)          ! INPUT IMAGE
        INTEGER*2 KB1(NSX,NZE)          ! INPUT IMAGE

IDIFABS = 0
        DO IZ = IZ1,IZ1-1+LBLZ
        DO IS = IS1,IS1-1+LBLS
           IDIF = KB1(IS,IZ) - KB0(IS,IZ)
           IDIFABS = IDIFABS + MIN (IDIFLMAX,ABS(IDIF))
        ENDDO
        ENDDO

RETURN
        END

C*********************************************************
C
        SUBROUTINE IPOBL (NSMAX,NSN,NZN, IBILD1, NSMAX2,IBILD2,
      +             LBLS,LBLZ)
C
C  V.BRANDT       03.02.87
C  LAST UPDATE    "
C
C  BILD VERGROESSERN DURCH PIXELWIEDERHOLUNG.
C
C  I N P U T :
C  NSMAX              MAX. SPALTENZAHL INPUTBILD.
C  NSN                AKT. SPALTENZAHL INPUTBILD
C  NZN                AKT. ZEILENZAHL  INPUTBILD.
C  NSMAX2             MAX. SPALTENZAHL OUTPUTBILD.
C  LBLS               BLOCKSIZE HORIZONTAL
C  LBLZ               "         VERTIKAL.
C  IBILD1(NSMAX,NZN)  INTEGER*2, INPUTBILD
C
C  O U T P U T :
C  IBILD2(NSMAX2,NZN*LBLZ)    INTEGER*2; BILD MIT NSN*LBLS SPALTEN
C                                   UND         NZN*LBLZ ZEILEN.
C
C*********************************************************

INTEGER*2 IBILD1(NSMAX,NZN)
        INTEGER*2 IBILD2(NSMAX2,*)
```

```
NSN2 = NSN*LBLS
NZN2 = NZN*LBLZ

DO IZ2 = 1,NZN
   IZ1 = (IZ2-1)*LBLZ+1
   DO IS2 = 1,NSN
      IS1 = (IS2-1)*LBLS+1
      DO IZ = IZ1,IZ1-1+LBLZ
      DO IS = IS1,IS1-1+LBLS
         IBILD2(IS,IZ) = IBILD1(IS2,IZ2)
      ENDDO
      ENDDO
   ENDDO
ENDDO

RETURN
END
```

What is claimed is:

1. A method for the determination of motion vector fields from digital image sequences that determines a motion vector field from respectively two successive image frames, said motion vector field relating a picture element of the other image frame to every picture element of the one image frame, whereby the relation is respectively defined by a motion vector that reproduces the displacement of the picture elements relative to one another and, whereby respectively all picture elements contained in a square or rectangular block of picture elements receive the same motion vector, comprising the steps of minimizing a composite objective function (Z) which is designed to take the differences in the luminance values of the picture elements of the two given frames allocated to one another into consideration and which weights the differences between neighboring motion vectors whose coordinates are adjacent, with the assistance of a smoothing measure (P); said minimization step being carried out by determining the motion vectors that minimize the objective function using constant motion vectors in blocks that are larger than the blocks ultimately desired; subsequently subdividing each of these blocks (16×16) into smaller, preferably equal-sized blocks until the desired block size (4×4) is achieved, whereby the objective function is again minimized by variation of the motion vectors after each diminution of the blocks.

2. The method according to claim 1, including, in the case of an insertion of an intermediate image between the two frames, allocating two picture elements to every picture element of this intermediate image, namely, one of said two picture elements from the first frame and one from the second frame.

3. The method according to claim 1, including the steps of identifying not only the differences between neighboring motion vectors in the motion vector field to be calculated, but also the differences between the motion vectors of the current motion vector field and those of the motion vector field calculated immediately before from a preceding pair of successive frames and using said identified differences in the smoothness measure, for the purpose of smoothing the motion vector field in the direction of the time axis, i.e. for assimilating successive motion vector fields.

4. The method according to claim 1, including the step of determining motion vector fields, for the purpose of inserting intermediate images, from two respective, successive frames transmitted with data compression from a coder via a channel to a decoder, and using corresponding motion vector fields that had already been previously transmitted for the initialization of the method.

5. The method according to claim 1, including the steps of subdividing the blocks by halving the side lengths of the blocks.

6. The method according to claim 5, including the step of optimizing every individual motion vector in every stage of the block-sub-division, in the case of the maximum block size and, following thereupon, after every block sub-division that is preferably carried out down to a block size of 4×4 picture elements, such optimization taking place by variation in an appertaining value range in sequence until a smaller value of the objective function can no longer be found for any motion vector in this way.

7. The method according to claim 6, including the step of ignoring some motion vectors of the appertaining value range in the optimization of a defined motion vector; whereby only a sub-set of the motion vectors are taken into consideration based on a predetermined pattern.

8. The method according to claim 1, including the step of weighting the differences in the luminance values of mutually corresponding picture elements of the two successive frames within a block of picture elements with the sum of the absolute values of the differences in the luminance values and using said weighted values as addends in the objective function to be minimized, whereby these addends form a first component of the objective function.

9. The method according to claim 1, including the step of weighting the differences in the luminance values of mutually corresponding picture elements of the two successive frames within a block of picture elements with the sum of the squares of the differences of the luminance values, and using said weighted values as addends in the objective function to be minimized, whereby these addends form a first component of the objective function.

10. The method according to claim 8 or 9, including the step of forming the absolute value norms of differences between neighboring motion vectors, whereby the sum of these absolute value norms forms a second component of the objective function and is used as smoothing measure.

11. The method according to claim 10, including the step of multiplying at least one of the two components by a weighting factor; and summing the corresponding products to form the objective function, whereby the objective function preferably has the form Z=Z1+αZ2, whereby Z1 is the first component, Z2 is the second component and α is the weighting factor.

12. The method according to claim 10, including the step of using only those four neighboring motion vectors of every motion vector whose coordinates are horizontally and vertically adjacent to the motion vector, i.e. that the coordinates thereof differ from the coordinates of the motion vector by (0, 1), (0,−1), (1,0) or (−1,0).

13. The method according to claim 10, including the step of initializing the motion vector field with large blocks (preferably 16×16 picture elements), before a motion vector is calculated at least once for every block, by modifying the smoothing measure so that, instead of the absolute values of the differences between neighboring motion vectors, the absolute value norms of the motion vectors to be optimized are multiplied by a weighting factor, and by employing of the products thus formed in the objective function by means of the smoothing measure.

14. The method according to any of claims 1–9, including the step of deriving the value range of the motion vectors within which the individual motion vectors are varied in order to minimize the objective function in dependence on the values of the motion vectors in the motion vector field that has already been calculated, so that the value range for the optimization of the motion vector field is small when neighboring motion vectors are the same or similar and is only larger when neighboring motion vectors exhibit great differences compared to one another.

15. The method according to any of claims 1–9, including the step of providing a logging system optimizing only those motion vectors, in view of a possible minimization of the value of the objective function, whose neighboring motion vectors have changed since the last optimization of the motion vector, so that the smoothness function may also have varied, whereby the logging system contains a logging field comprising a memory location per block for storing a control information for the optimization execution.

* * * * *